(12) United States Patent
Ikenuma et al.

(10) Patent No.: US 11,251,415 B2
(45) Date of Patent: Feb. 15, 2022

(54) STORAGE BATTERY ELECTRODE, MANUFACTURING METHOD THEREOF, STORAGE BATTERY, ELECTRONIC DEVICE, AND GRAPHENE

(71) Applicant: SEMICONDUCTOR ENERGY LABORATORY CO., LTD., Atsugi (JP)

(72) Inventors: Tatsuya Ikenuma, Kanagawa (JP); Yumiko Yoneda, Kanagawa (JP)

(73) Assignee: SEMICONDUCTOR ENERGY LABORATORY CO., LTD., Kanagawa-ken (JP)

(*) Notice: Subject to any disclaimer, the term of this patent is extended or adjusted under 35 U.S.C. 154(b) by 117 days.

(21) Appl. No.: 16/727,984

(22) Filed: Dec. 27, 2019

(65) Prior Publication Data
US 2020/0144598 A1 May 7, 2020

Related U.S. Application Data

(63) Continuation of application No. 14/836,420, filed on Aug. 26, 2015, now Pat. No. 10,529,977.

(30) Foreign Application Priority Data

Aug. 27, 2014 (JP) .............................. JP2014-172503

(51) Int. Cl.
*H01M 4/133* (2010.01)
*H01M 4/04* (2006.01)
(Continued)

(52) U.S. Cl.
CPC .......... *H01M 4/133* (2013.01); *C01B 32/184* (2017.08); *H01M 4/049* (2013.01);
(Continued)

(58) Field of Classification Search
CPC ... C01B 32/184; H01M 4/0416; H01M 4/049; H01M 4/133; H01M 4/1393; H01M 4/587; H01M 4/625; Y02E 60/10; Y02E 60/13
See application file for complete search history.

(56) References Cited

U.S. PATENT DOCUMENTS

| 8,476,510 B2 | 7/2013 | Swager et al. |
| 8,685,569 B2 | 4/2014 | Oguni et al. |
(Continued)

FOREIGN PATENT DOCUMENTS

| CN | 103000862 A | 3/2013 |
| CN | 104937755 A | 9/2015 |
(Continued)

OTHER PUBLICATIONS

International Search Report (Application No. PCT/IB2015/056417) dated Dec. 1, 2015.
(Continued)

*Primary Examiner* — Lingwen R Zeng
(74) *Attorney, Agent, or Firm* — Nixon Peabody LLP; Jeffrey L. Costellia

(57) ABSTRACT

To provide graphene oxide that has high dispersibility and is easily reduced. To provide graphene with high electron conductivity. To provide a storage battery electrode including an active material layer with high electric conductivity and a manufacturing method thereof. To provide a storage battery with increased discharge capacity. A method for manufacturing a storage battery electrode that is to be provided includes a step of dispersing graphene oxide into a solution containing alcohol or acid, a step of heating the graphene oxide dispersed into the solution, and a step or reducing the graphene oxide.

14 Claims, 17 Drawing Sheets

(51) Int. Cl.
*H01M 4/587* (2010.01)
*C01B 32/184* (2017.01)
*H01M 4/62* (2006.01)
*H01M 4/1393* (2010.01)

(52) U.S. Cl.
CPC ....... *H01M 4/0416* (2013.01); *H01M 4/1393* (2013.01); *H01M 4/587* (2013.01); *H01M 4/625* (2013.01); *Y02E 60/10* (2013.01); *Y02E 60/13* (2013.01)

(56) References Cited

U.S. PATENT DOCUMENTS

| | | |
|---|---|---|
| 2002/0102459 A1 | 8/2002 | Hosoya et al. |
| 2010/0178464 A1 | 7/2010 | Choi et al. |
| 2011/0121240 A1* | 5/2011 | Amine ................ H01M 4/0471 252/502 |
| 2011/0159372 A1* | 6/2011 | Zhamu ................. H01M 4/139 429/232 |
| 2011/0227000 A1* | 9/2011 | Ruoff .................... C01B 32/192 252/502 |
| 2012/0315550 A1 | 12/2012 | Liu et al. |
| 2012/0328956 A1 | 12/2012 | Oguni et al. |
| 2013/0045418 A1 | 2/2013 | Oguni et al. |
| 2013/0052547 A1 | 2/2013 | Ogino et al. |
| 2013/0065120 A1 | 3/2013 | Miwa et al. |
| 2013/0157034 A1 | 6/2013 | Choi et al. |
| 2013/0190449 A1 | 7/2013 | Kinloch et al. |
| 2013/0212879 A1 | 8/2013 | Ogino |
| 2013/0266859 A1 | 10/2013 | Todoriki et al. |
| 2014/0004412 A1 | 1/2014 | Ogino |
| 2014/0184172 A1 | 7/2014 | Momo et al. |
| 2015/0093648 A1 | 4/2015 | Son et al. |
| 2015/0333320 A1 | 11/2015 | Tamaki et al. |

FOREIGN PATENT DOCUMENTS

| | | |
|---|---|---|
| EP | 2511973 A | 10/2012 |
| EP | 2950374 A | 12/2015 |
| JP | 2002-110162 A | 4/2002 |
| JP | 2013-069677 A | 4/2013 |
| JP | 2013-513904 | 4/2013 |
| JP | 2013-079176 A | 5/2013 |
| JP | 2013-544740 | 12/2013 |
| JP | 2014-007141 A | 1/2014 |
| JP | 2014-505580 | 3/2014 |
| JP | 2015-167127 A | 9/2015 |
| KR | 2010-0083954 A | 7/2010 |
| TW | 201324936 | 6/2013 |
| TW | 201444157 | 11/2014 |
| WO | WO-2014/115669 | 7/2014 |

OTHER PUBLICATIONS

Written Opinion (Application No. PCT/IB2015/056417) dated Dec. 1, 2015.

* cited by examiner

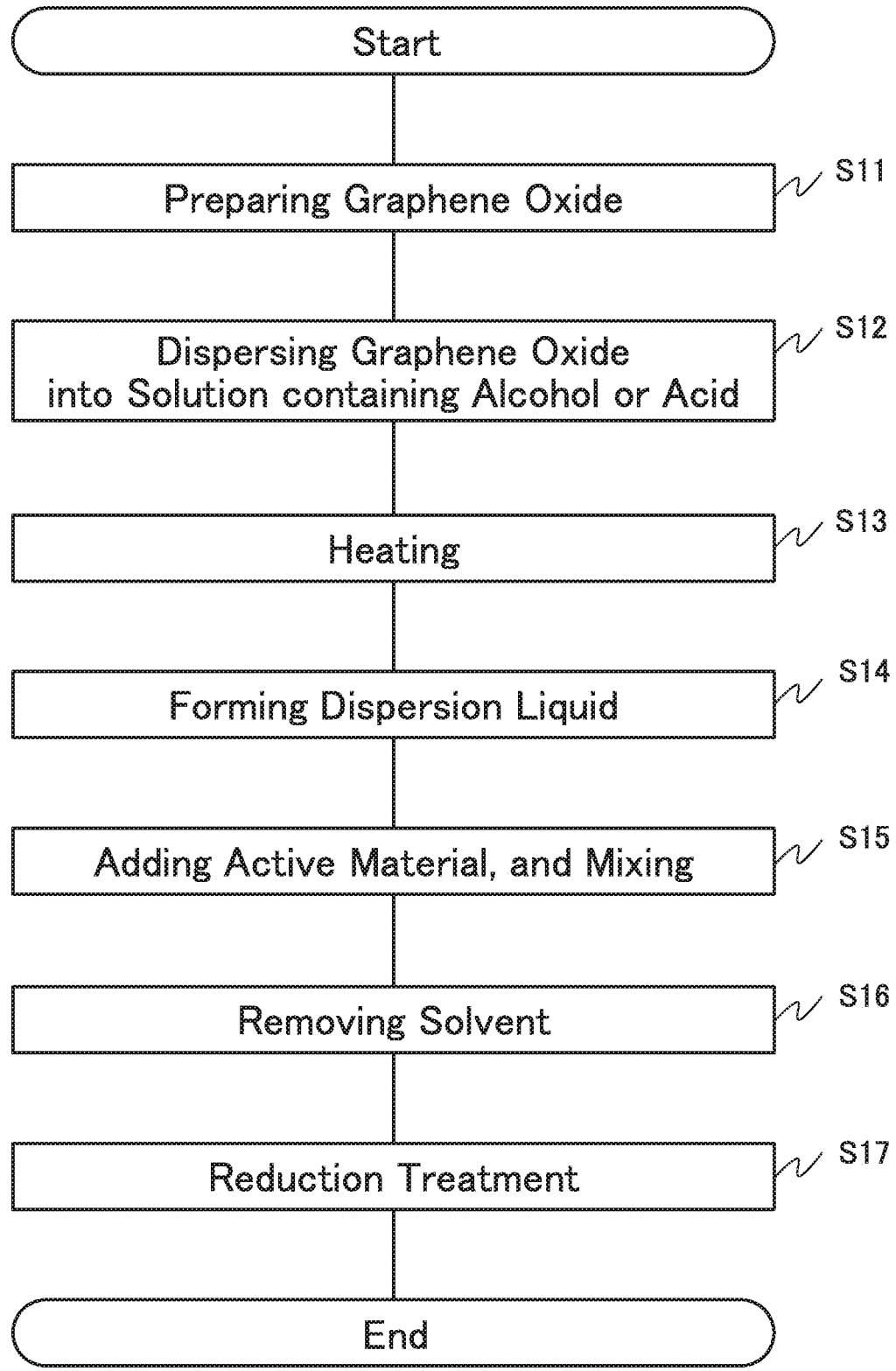

STORAGE BATTERY ELECTRODE, MANUFACTURING METHOD THEREOF, STORAGE BATTERY, ELECTRONIC DEVICE, AND GRAPHENE

TECHNICAL FIELD

One embodiment of the present invention relates to a storage battery electrode, a manufacturing method thereof, a storage battery, an electronic device, and graphene.

Note that one embodiment of the present invention is not limited to the above technical field. One embodiment of the invention disclosed in this specification and the like relates to an object, a method, and a manufacturing method. Moreover, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a storage device, a method for driving any of them, and a method for manufacturing any of them.

BACKGROUND ART

With the recent rapid spread of portable electronic devices such as mobile phones, smartphones, electronic books, and portable game machines, secondary batteries for drive power supply have been increasingly requited to be smaller and to have higher capacity. Nonaqueous secondary batteries typified by lithium-ion secondary batteries, which have advantages such as high energy density and high capacity, have been widely used as secondary batteries used for portable electronic devices.

A lithium-ion secondary battery, which is one of nonaqueous storage batteries and widely used due to its high energy density, includes a positive electrode including an active material such as lithium cobalt oxide ($LiCoO_2$) or lithium iron phosphate ($LiFePO_4$), a negative electrode formed of a carbon material such as graphite capable of reception and release of lithium ions, a nonaqueous electrolytic solution in which a supporting electrolyte formed of a lithium salt such as $LiBF_4$ or $LiPF_6$ is dissolved in an organic solvent such as ethylene carbonate or diethyl carbonate, and the like. A lithium-ion secondary battery is charged and discharged in such a way that lithium ions in the secondary battery move between the positive electrode and the negative electrode through the nonaqueous electrolyte solution and inserted into or extracted from the active materials of the positive electrode and the negative electrode.

A binder is mixed into the positive electrode or the negative electrode in order that active materials can be bound or an active material and a current collector can be bound. Since the binder is generally an organic high molecular compound such as polyvinylidene fluoride (PVDF) which has an insulating property, the electron conductivity of the binder is extremely low. Therefore, as the ratio of the mixed binder to the active material is increased, the amount of the active material in the electrode is relatively decreased, resulting in the lower discharge capacity of the secondary battery.

Hence, by mixture of a conductive additive such as acetylene black (AB) or a graphite particle, the electron conductivity between active materials or between an active material and a current collector can be improved. Thus, an active material with high electron conductivity can be provided (see Patent Document 1).

Graphene oxide (abbreviation: GO) is mixed with an active material, a binder, a solvent, or the like to make a mixture, and then the mixture is heated, whereby an active material layer can be formed. The graphene oxide in the active material is reduced by the heat treatment, so that the graphene can be an active material that functions as a conductive additive. It has been found that in such an active material layer, a network for electron conduction is formed and excellent electron conductivity is obtained (see Patent Document 2).

REFERENCE

Patent Document

[Patent Document 1] Japanese Published Patent Application No. 2002-110162
[Patent Document 2] Japanese Published Patent Application No. 2014-007141

DISCLOSURE OF INVENTION

In the development of a storage battery, an electrode including an active material layer with high electron conductivity has to be used in order to increase discharge capacity. For formation of the active material layer with high electron conductivity, graphene oxide with high dispersibility with respect to a solvent needs to be used. In addition, it is necessary that the graphene obtained by reduction of the graphene oxide have excellent electron conductivity. In order to save the energy and shorten the time for manufacturing electrodes, graphene oxide that can be easily reduced has to be used for manufacturing the electrodes.

An object of one embodiment of the present invention is to improve the dispersibility of graphene oxide with respect to a solvent. Another object is to improve the electron conductivity of the graphene. Another object is to provide graphene oxide that can be easily reduced.

Another object of one embodiment of the present invention is to provide an electrode for storage battery including an active material layer with high electron conductivity. Another object of one embodiment of the present invention is to provide a method for manufacturing an electrode for storage battery including an active material layer with high electron conductivity. Another object of one embodiment of the present invention is to provide a battery with high discharge capacity. Another object of one embodiment of the present invention is to provide a storage battery with improved cycle characteristics. Another object of one embodiment of the present invention is to provide a storage battery with a long lifetime. Another object of one embodiment of the present invention is to provide a novel storage battery, a novel electrode, a novel material, or novel graphene. Another object of one embodiment of the present invention is to provide a novel method for manufacturing a storage battery, a novel method for manufacturing an electrode, a novel method for manufacturing a material, or a novel method for manufacturing graphene.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a method for manufacturing a storage battery electrode in which an active material layer including graphene is formed over a current collector. The method for manufacturing a storage battery electrode includes a step of dispersing graphene oxide in a solution containing alcohol or acid, a step of heating the graphene oxide dispersed in the solution, and a step of reducing the graphene oxide.

One embodiment of the present invention is a method for manufacturing a storage battery electrode. The method includes a step of dispersing graphene oxide in a solution containing alcohol or acid, a step of heating the grapheme oxide dispersed in the solution, a step of forming a mixture of the graphene oxide, an active material, a binder, and a solvent, a step of applying the mixture on a current collector, a step of removing a solvent contained in the applied mixture, and a step of reducing the graphene oxide contained in the applied mixture, so that an active material layer including graphene is formed over the current collector.

One embodiment of the present invention is a method for manufacturing a storage battery electrode. The method includes a step of dispersing graphene oxide in a solution containing alcohol or acid, a step of heating the graphene oxide dispersed in the solution, a step of mixing the grapheme oxide and au active material to form a first mixture, a step of reducing the graphene oxide contained in the first mixture to form a second mixture, a step of applying a third mixture containing the second mixture, a binder, a conductive additive, and a solvent on a current collector, and a step of removing the solvent contained in the third mixture, so that an active material layer including graphene is formed over the current collector.

According to one embodiment of the present invention, in each of the methods for manufacturing a storage battery electrode, the graphene oxide is reduced by heating.

According to one embodiment of the present invention, in each of the methods for manufacturing a storage battery electrode, the graphene oxide is reduced by heating at a temperature higher than or equal to 60° C. and lower than or equal to 150° C.

According to one embodiment of the present invention, in each of the methods for manufacturing a storage battery electrode, the graphene oxide is reduced by being immersed in a polar solvent containing a reducing agent.

One embodiment of the present invention is a storage battery electrode manufactured by any of the above methods for manufacturing an electrode for a storage battery.

One embodiment of the present invention is a storage battery electrode, including an active material layer and a current collector. The active material layer includes an active material, graphene, and a binder. The graphene includes an alkyl group supported by an ether bond or an ester bond. The active material layer is provided over the current collector.

One embodiment of the present invention is a storage battery including a first electrode and a second electrode. The first electrode is any one of the above storage battery electrodes and has a function of operating as one of a positive electrode and a negative electrode. The second electrode has a function of operating as the other of the positive electrode and the negative electrode.

One embodiment of the present invention is an electronic device including the storage battery and at least one of a display panel, an operation key, a speaker, and a microphone.

One embodiment of the present invention is graphene that is formed by reducing graphene oxide including an alkyl group supported by an ether bond or an ester bond.

One embodiment of the present invention is graphene that includes an alkyl group supported by an ether bond or an ester bond.

According to one embodiment of the present invention, in the graphene described above, the alkyl group has greater than or equal to 1 and less than or equal to 4 carbon atoms.

One embodiment of the present invention is graphene that is made by reduction of graphene oxide into which alcohol is intercalated.

According to one embodiment of the present invention, in the graphene described above, alcohol has greater than to equal to 1 and less than or equal to 4 carbon atoms.

According to one embodiment of the present invention, the dispersibility of graphene oxide with respect to a solvent can be improved. In addition, the electron conductivity of graphene can be improved. Moreover, graphene oxide that can be easily reduced can be provided.

According to one embodiment of the present invention, a storage battery electrode including an active material layer with high electron conductivity can be provided. According to one embodiment of the present invention, a method for manufacturing a storage battery electrode including an active material layer with high electron conductivity can be provided. According to one embodiment of the present invention, a storage battery with high discharge capacity can be provided. According to one embodiment of the present invention, a storage battery with improved cycle characteristics can be provided. According to one embodiment of the present invention, a storage battery with a long lifetime can be provided. According to one embodiment of the present invention, a novel storage battery, a novel electrode, a novel material, or a novel graphene can be provided. According to one embodiment of the present invention, a novel method for manufacturing a storage battery, a novel method for manufacturing an electrode, a novel method for manufacturing a material or a novel method for manufacturing graphene can be provided.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF DRAWINGS

FIG. 1 is a flow chart showing a method for manufacturing an electrode according to one embodiment.

BEST MODE FOR CARRYING OUT THE INVENTION

Figure 2A:
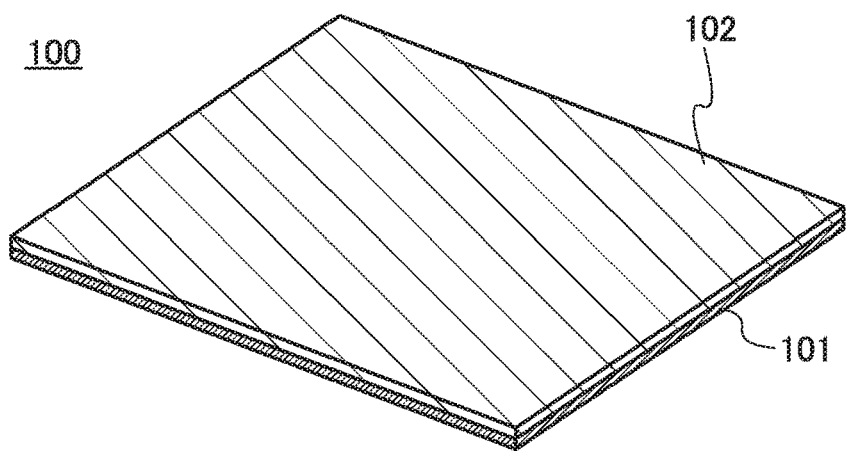
FIGS. 2A to 2C illustrate a structure of an electrode according to one embodiment.

Hereinafter, embodiments will be described with reference to drawings. However, the embodiments can be implemented in many different modes, and it will be readily appreciated by those skilled in the art that modes and details thereof can be changed in various ways without departing from the spirit and scope of the present invention. Thus, the present invention should not be interpreted as being limited to the following description of the embodiments.

Note that in the structures of the invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

Note that in each drawing described in this specification, the size, the film thickness, or the region of each component is exaggerated for clarity in some cases. Therefore, embodiments of the present invention are not limited to such scales in the drawings.

Embodiment 1

Figure 2B:
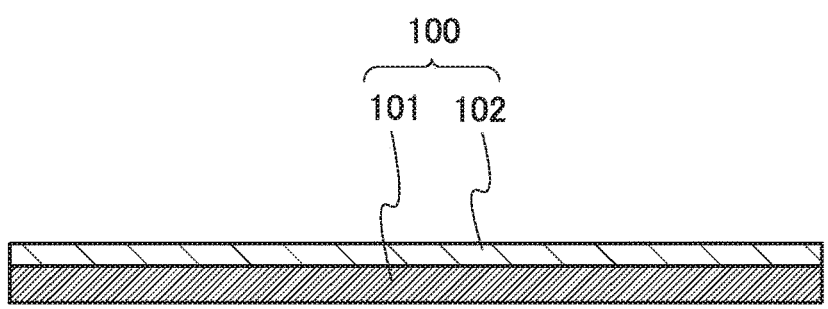
Figure 2C:
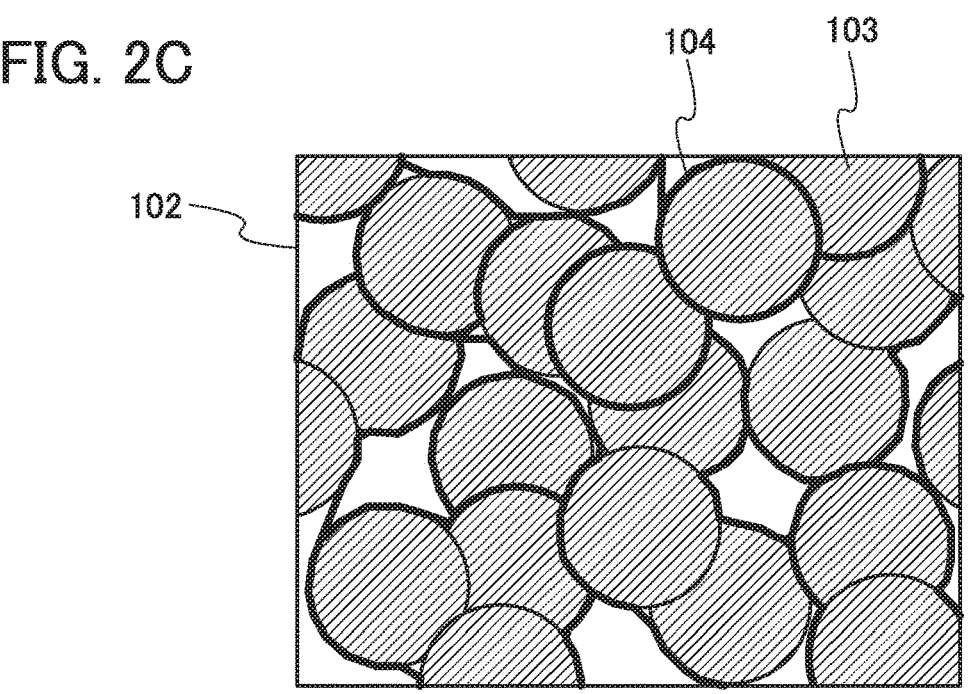
Figure 3A:
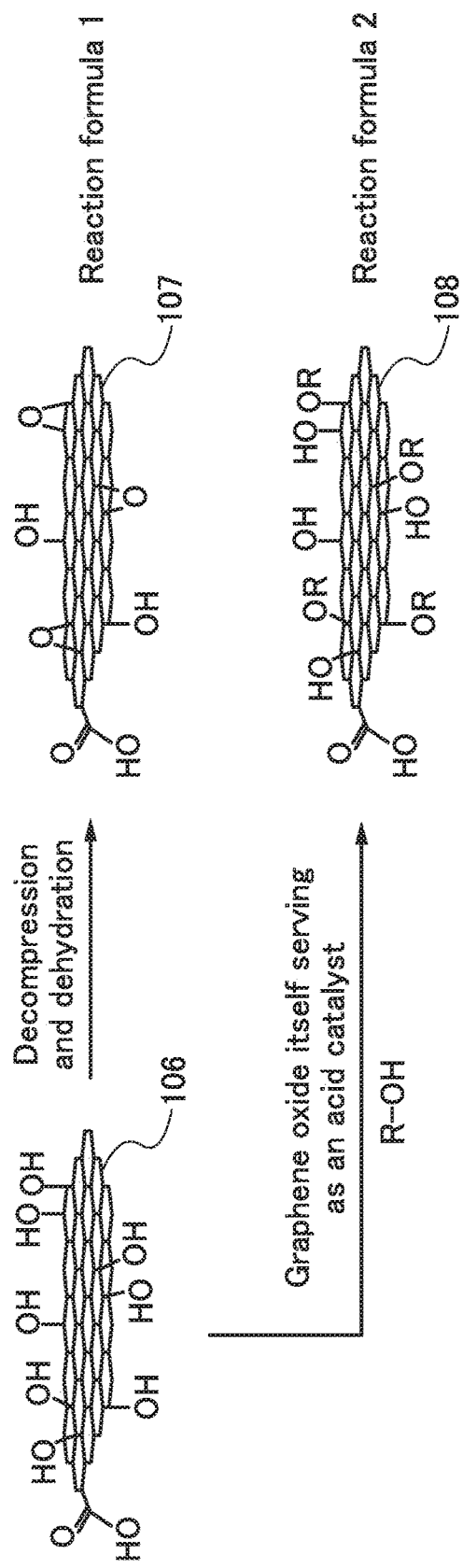
FIGS. 3A and 3B each illustrate a reaction and a structure of graphene oxide according to one embodiment.
Figure 3B:
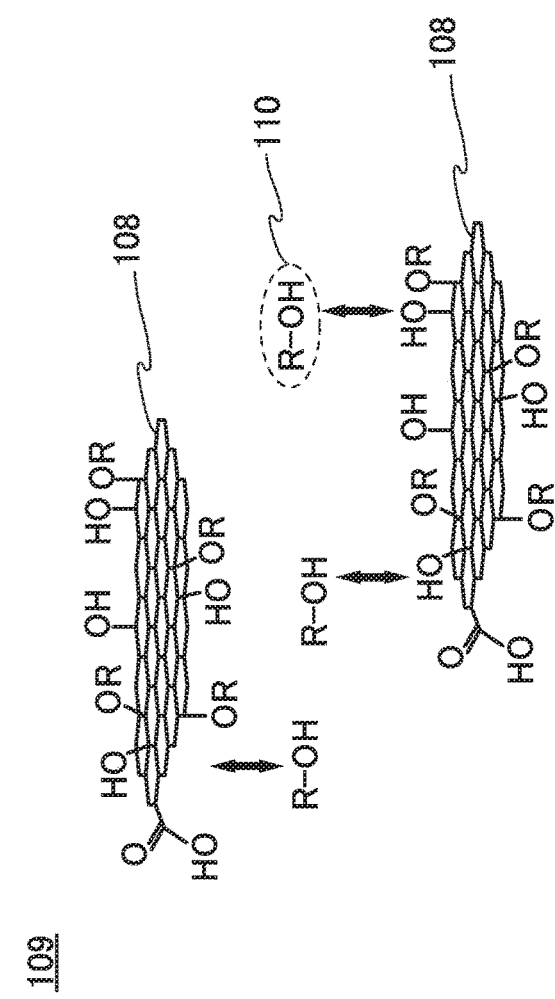

In this embodiment, a storage battery electrode of one embodiment of the present invention is described with reference to FIG. 1, FIGS. 2A to 2C, and FIGS. 3A and 3B. FIG. 1 shows a flowchart for describing a method for preparing graphene oxide used formation of an electrode. FIGS. 2A to 2C illustrate a structure of the electrode. FIGS. 3A and 3B illustrate a reaction and a structure of graphene oxide.

FIG. 2A is a perspective view of a storage battery electrode 100, and FIG. 2B is a longitudinal sectional view of the storage battery electrode 100. Although the storage battery electrode 100 in the shape of a rectangular sheet is illustrated in FIG. 2A, the shape of the storage battery electrode 100 is not limited thereto and may be any appropriate shape. An active material layer 102 is formed on only one surface of a current collector 101 in FIGS. 2A and 2B; however, active material layers 102 may be formed so that the current collector 101 is sandwiched therebetween. The active material layer 102 does not necessarily need to be formed on the entire surface of the current collector 101 and a region that is not coated, such as a region for connection to an electrode tab, is provided as appropriate.

FIG. 2C is a cross-sectional view of the active material layer 102. The active material layer 102 includes particles of an active material 103, graphene 104 that serves as a conductive additive, and a binder (not illustrated). The graphene 104 may include an alkyl group supported by an ether bond or an ester bond. Alternatively, the graphene 104 may have a structure into which alcohol may be intercalated.

FIG. 2C shows substantially uniform dispersion of the sheet-like graphene 104 in the active material layer 102. The graphene 104 is schematically shown by heavy lines in FIG. 2C but are actually thin films each having a thickness corresponding to the thickness of a single layer or a multiple layer of carbon molecules. The plurality of graphenes 104 are formed in such a way as to wrap, coat, or be adhered to a plurality of particles of the active material 103, so that the graphenes 104 make surface contact with the particles of the active material 103. Furthermore, the graphenes 104 are also in surface contact with each other; consequently, the plurality of graphenes 104 form a three-dimensional network for electronic conduction.

This is because graphene oxides with extremely high dispersibility in a solvent are used for formation of the graphene 104. The solvent is removed from a dispersion liquid in which the graphene oxide is uniformly dispersed, and the graphene oxide is reduced to give graphene; hence, pieces of the graphene 104 remaining in the active material layer 102 are partly overlapped with each other and dispersed such that surface contact is made, thereby forming a path for electron conduction.

The graphene is a carbon material with a crystalline structure in which hexagonal skeletons of carbon are arranged in a planar form. Due to its electrical, mechanical, or chemical characteristics which are surprisingly excellent, the graphene has been expected to be applied to a variety of fields of, for example, field-effect transistors with high mobility, highly sensitive sensors, highly-efficient solar cells, and next-generation transparent conductive films and has attracted a great deal of attention.

Note that graphene in this specification includes single-layer graphene and multilayer graphene including two to hundred layers. Single-layer graphene refers to a one-atom-thick sheet of carbon molecules having it bonds. Graphene oxide refers to a compound formed by oxidation of such graphene and is a plurality of graphenes in which the interlayer distance between adjacent single-layer graphenes is greater than 0.34 nm and less than or equal to 1.5 nm. In the multilayer graphene, strong interaction is generated between single-layer graphenes. Meanwhile graphene oxide includes a polar functional group such as an epoxy group, a carbonyl group, a carboxyl group, or a hydroxyl group; thus in the graphene oxide, interaction generated between single-layer graphenes is low. Accordingly, a distance between a plurality of single-layer graphenes in the graphene oxide is larger than a distance between a plurality of single-layer graphenes in the multilayer graphene.

In the case where the graphene oxide is reduced to form graphene that is also called reduced graphene oxide (abbreviation: RGO), not entire oxygen or the like contained in the graphene oxide is removed but part of oxygen may remain in the graphene, and an alkyl group supported by an ether bond or an ester bond may be included. Furthermore, alcohol that is intercalated into graphene oxide is not entirely removed but may partly remain in the graphene.

In this specification and the like, a compound including graphene as a basic skeleton is referred to as graphene compound. Each of graphene, graphene oxide, and RGO is one of graphene compounds.

An active material layer to which a graphene is added as a conductive additive can be manufactured by the following method. First, after the graphene is dispersed into a solvent, a binder is added to the active material and a mixture is obtained by mixing. Lastly, after the mixture is applied to a current collector, the solvent is removed. Thus, the active material layer including graphene as a conductive additive is formed.

In order that a network for electron conduction can be formed in an active material layer with use of the graphene as a conductive additive, the graphene needs to be uniformly dispersed in the solvent. Dispersibility in the solvent directly depends on the dispersibility of the graphene in an active material layer. When the dispersibility of the graphene is low, the graphene is aggregated in the active material layer and localized, which prevents formation of the network. Thus, the dispersibility of the graphene used as a conductive additive in the solvent is an extremely important factor in the improvement of the electron conductivity of the active material layer.

When graphene oxide used as a conductive additive is mixed with an active material, a binder, and a solvent to form a mixture, the graphene oxide is uniformly dispersed. Thus, in an active material layer in which graphene oxide is reduced to form graphene, a network for electron conduction in the active material layer is formed, and excellent electron conductivity is obtained.

Such a difference in the dispersibility in an active material layer between the graphene and the graphene formed by reducing graphene oxide after the mixture including the graphene oxide is formed can be explained below as a difference in the dispersibility in a polar solvent.

The graphene is a crystal structure body of carbon in which hexagonal skeletons are arranged in a planar form as already described, and does not substantially include a functional group in the structure body. The surface of the graphene dues nut have polarity but hydrophobic property. Thus, interaction between the polar solvent and graphene is extremely low, and interaction between graphenes is high, which means that graphenes are easily aggregated.

A graphene oxide includes a polar functional group such as an epoxy group, a carbonyl group, a carboxyl group, or a hydroxyl group. That means interaction between the graphene oxide and a polar solvent is high, and the graphene oxide is hardly aggregated in the polar solvent. Thus, the graphene oxide can be uniformly dispersed in the polar solvent.

In view of the foregoing, in order that a network with high electron conductivity be formed in an active material layer by using the graphene as a conductive additive, use of the graphene oxide with high dispersibility in a polar solvent in manufacture of a mixture of an active material and graphene oxide is very effective.

The length of one side of the graphene oxide is greater than or equal to 50 nm and less than or equal to 100 μm, preferably greater than or equal to 800 nm and less than or equal to 20 μm.

In an electrode of this embodiment, the following graphene oxide is used as a raw material of a conductive additive: graphene oxide including a substituent such as an alkyl group supported by an ether bond or au ester bond, in addition to the above-described functional group such as an epoxy group, a carbonyl group, a carboxyl group, or a hydroxyl group; and graphene oxide in which alcohol is intercalated. The substituent such as an alkyl group supported by an ether bond or an ester bond in the graphene oxide inhibits aggregation of graphene oxides more efficiently than an epoxy group or a hydroxyl group does. The alcohol intercalated into graphene oxide inhibits aggregation of graphene oxides and also prevents the hydroxyl group in the graphene oxides from being an epoxy group by dehydrogenation. Thus, the graphene oxide including an alkyl group supported by an ether bond or an ester bond or the graphene oxide in which alcohol is intercalated can be dispersed more efficiently and uniformly in a polar solvent.

A method for manufacturing graphene oxide of this embodiment and a method for reducing the graphene oxide are described with reference to FIG. 1.

Graphene oxide as a raw material can be prepared by an oxide method called Hummers method (Step S11). The Hummers method is as follows: a sulfuric acid solution of potassium permanganate is mixed into graphite powder to cause oxidation reaction; thus, a first dispersion liquid containing graphite oxide is formed. Through the oxidation of carbon of graphite, functional groups such as an epoxy group, a carbonyl group, a carboxyl group, or a hydroxyl group are bonded in the graphite oxide. Accordingly, the interlayer distance between a plurality of graphene layers is longer than that in the graphite, so that the graphite oxide can be easily separated into thin pieces by interlayer separation. Then, ultrasonic vibration is applied to the first dispersion liquid, so that the graphite oxide can be cleaved to separate a graphene oxide and to form a dispersion liquid containing a graphene oxide. The solvent is removed from the dispersion liquid including the graphene oxide, so that a powdery graphene oxide can be obtained.

Note that the method for forming graphene oxide is not limited to the Hummers method using a sulfuric acid solution of potassium permanganate; for example, the Hummers method using nitric acid, potassium chlorate, nitric acid sodium, and the like or a method for forming graphene oxide other than the Hummers method may be employed as appropriate.

The graphite oxide may be separated into thin pieces by application of ultrasonic vibration, by irradiation with microwaves, radio waves, or thermal plasma, or by application of physical stress.

A solution containing alcohol or acid is added to a dispersion liquid containing graphene oxide or powdery graphene oxide to disperse graphene oxide, whereby a second dispersion liquid is formed (Step S12).

As a solvent for dispersion of oxide graphene used in Step S12, a solution containing alcohol or acid can be used. Alcohol such as methanol, ethanol, 1-propanol, 2-propanol, 1-butanol, 2-butanol, isobutyl alcohol, or tert-butyl alcohol is preferably used. Long-chain alcohol is preferable because the dispersibility of graphene oxide is improved. Furthermore, alcohol with a low boiling point is preferably used because a solvent is easily vaporized by heating the second dispersion liquid (Step S13). Thus, ethanol, 1-propanol, 2-propanol, or 2-butanol is preferably used.

As a solution containing acid, a solution containing carboxylic acid can be used. Long-chain carboxylic acid is preferably used because when it is bonded to graphene oxide, the dispersibility of graphene oxide can be improved. Furthermore, carboxylic acid with a low boiling point is preferably used because a solvent is easily vaporized by heating the second dispersion liquid. Thus, formic acid or acetic acid is preferably used.

Besides, organic acid such as sulfonic acid, vinyl carboxylic acid, or nucleic acid or an inorganic acid such as phosphoric acid, hydrogen halide, boric acid, or sulfuric acid can be used as acid. As a solvent, water, acetone, methanol, ethanol, 1-propanol, 2-propanol, dichloromethane, chloroform, tetrahydrofuran (THF), or the like can be used.

Next, the second dispersion liquid containing graphene oxide is heated to vaporize the solvent in the second dispersion liquid (Step S13). It is preferable that the second dispersion liquid be heated under reduced pressure, at a temperature higher than or equal to room temperature and lower than or equal to 50° C., whereby the solvent is vaporized. When this step is performed at low temperature, bumping of the solvent can be prevented. The heat treatment can promote a reaction of graphene oxide, so that time needed for reaction can be shortened. Thus, for example, heat treatment at about 30° C. to 40° C. is preferably performed. The heat temperature may be adjusted on the basis of the boiling point of alcohol or acid added to the graphene oxide in Step S12. With this operation, the graphene oxide can be modified. In addition, alcohol can be intercalated into the graphene oxide.

The structure and reaction of the graphene oxide are described with reference to FIG. 3A. An example of reaction in which the graphene oxide is modified is shown in FIG. 3A. For comparison, in Reaction Formula 1, a reaction occurring in the case where the graphene oxide is heated without performing Step S12 is shown. In Reaction Formula 2, a reaction occurring in the case where the graphene oxide is heated under condition where alcohol is used as a solvent for dispersing the graphene oxide in Step S12. In other words, graphene oxides 106, 107, and 108 respectively indicate graphene oxide that is not heated, grapheme oxide generated when being heated without performing Step S12, and graphene oxide generated when being heated after Step S12. Note that in FIGS. 3A and 3B, R indicates an alkyl group.

As shown in Reaction Formula 1, when graphene oxide is heated without Step S12, molecular dehydration reaction is caused between hydroxyl groups bonded to two adjacent carbons in the graphene oxide 106, and the graphene oxide 107 including an epoxy group is formed. In contrast, when heating is performed after Step S12, the reaction shown in Reaction Formula 1 is inhibited, and as shown in Reaction Formula 2, molecular dehydration reaction preferentially proceeds between a hydroxyl group of the graphene oxide 106 and a hydroxyl group of the alcohol. As a result, the graphene oxide 108 in which an alkyl group is supported by an ether bond (also referred to as graphene oxide 108 including an alkoxy group) is generated. In this case, the graphene oxide 106 or the graphene oxide 108 itself serves as an acid catalyst.

The graphene oxide 108 includes an alkoxy group with higher volume than that of a hydroxyl group or an epoxy group; thus it has higher dispersibility and is more likely to separate in the solvent than the graphene oxide 106.

In order to reduce the graphene oxide 107 including an epoxy group by heating, heat treatment is needed to be performed at a high temperature in some cases. In contrast, in the graphene oxide 108, generation of an epoxy group is inhibited. Thus, the graphene oxide 108 is likely to be reduced (Step S17) at a lower temperature than the case of the graphene oxide 107.

When the graphene oxide is dispersed in a solution containing a carboxylic acid, epoxide ring-opening reaction occurs between a carboxyl group included in the carboxylic acid and an epoxy group included in the graphene oxide, so that ester is generated. Thus, an alkyl group is supported by an ester bond in the graphene oxide, so that aggregation of graphene oxides can be inhibited.

FIG. 3B shows an example of the structure of graphene oxide to which alcohol is intercalated. Alcohol 110 can be inserted (intercalated) between the graphene oxides 108 by interaction with a substituent such as a hydroxyl group included in the graphene oxide. Accordingly, aggregation of graphene oxides with hydrogen bond can be prevented. In addition, the hydroxyl group in the graphene oxide can be prevented from being an epoxy group by dehydrogenation.

Note that graphene oxide to which alcohol can be intercalated is not limited to the graphene oxide including an alkoxy group (e.g., the graphene oxide 108). Even in graphene oxide without an alkoxy group (e.g., the graphene oxide 106 or the graphene oxide 107), alcohol can be intercalated.

Next, a method for generating graphene by reducing the graphene oxide is described.

First, the graphene oxide that has been subjected to Step S13 is added to a solvent and dispersed, so that a third dispersion liquid is formed (Step S14).

As a solvent used for the third dispersion liquid, a polar solvent other than water can be used. Examples of the material of the polar solvent are methanol, ethanol, acetone, dimethylformamide (DMF), N-methylpyrrolidone (NMP), dimethyl sulfoxide (DMSO), and a mixed solution of any two or more of the above.

Next, an active material is added to the third dispersion liquid and mixed, whereby a mixture is formed (Step S15). In this step, a binder may be mixed into the mixture. A solvent may be added as needed.

Next, the mixture formed in Step S15 is heated (Step S16). In this step, heat treatment is performed at a temperature higher than or equal to 60° C. and lower than or equal to 170° C., for a time period longer than or equal to a minute and shorter than or equal to 10 hours, whereby the solvent is vaporized. There is no particular limitation on the atmosphere.

Next, reduction treatment is performed on the heated mixture (Step S17). For a reduction method, at least one of thermal reduction, chemical reduction, and the like is performed. As described above, the graphene oxide of this embodiment has a property of being likely to be reduced at a low temperature. Thus, under the reduction condition that is milder than the conventional case, graphene can be formed.

In the case where thermal reduction is performed in Step S17, the mixture that has been heated in Step S16 is subjected to heating in a reduction atmosphere or a reduced pressure atmosphere. Heating is preferably performed for a time period longer than or equal to an hour and shorter than or equal to 30 hours, at a temperature higher than or equal to 60° C. and lower than or equal to 170° C., further preferably higher than or equal to 60° C. and lower than or equal to 150° C. Through this step, the solvent or water left in the mixture is vaporized, and oxygen contained in an epoxy group in the graphene oxide is released. Thus, the graphene oxide can be processed into graphene. Note that oxygen in the graphene oxide is not necessarily entirely released and may partly remain in the graphene. The thermal reduction may be performed concurrently with the heat treatment in Step S16.

The substituent such as an alkyl group supported by an ether bond or an ester bond in the graphene oxide is released in a form of alcohol, an alkoxide ion, carboxylic acid, a carboxylate ion, or the like. Note that the substituent in the graphene oxide is not necessarily entirely released and may partly remain in the graphene.

The above alcohol, alkoxide ion, carboxylic acid, carboxylate ion, or the like has superior release property to oxygen. Thus, in the thermal reduction in a method for manufacturing an electrode of this embodiment, reduction can be performed at a lower temperature than the conventional case. Specifically, the mixture can be reduced by heating at a temperature higher than or equal to 60° C. and lower than or equal to 100° C. for a time period longer than or equal to an hour and shorter than or equal to 30 hours, in a reduction atmosphere or a reduced pressure atmosphere. The heating temperature may be adjusted on the basis of a boiling point of alcohol or carboxylic acid added to the graphene oxide in Step S12.

In the case where chemical reduction is performed in Step S17, the mixture that has been heated in Step S16 is immersed in a solvent containing a reducing agent, so that the graphene oxide is reduced. Note that oxygen and substituents such as an alkyl group in the graphene oxide are not necessarily entirely released and may partly remain in the graphene. This reduction treatment is preferably performed at higher than or equal to room temperature and lower than or equal to 150° C.

Examples of the reducing agent are ascorbic acid, hydrazine, dimethyl hydrazine, hydroquinone, sodium boron hydride ($NaBH_4$), tetra butyl ammonium bromide (TBAB), $LiAlH_4$, ethylene glycol, polyethylene glycol, N,N-diethylhydroxylamine, and a derivative thereof.

A polar solvent can be used as the solvent. Any material can be used for the polar solvent as long as it can dissolve the reducing agent. For example, any one of water, methanol, ethanol, acetone, THF, DMF, NMP, DMSO, and a mixed solution of any two or more of the above polar solvents can be used.

As the reducing solution containing a reducing agent and a solvent, a mixed solution of ethanol and ascorbic acid, or a mixed solution of water, ascorbic acid, and lithium hydroxide can be used.

Then, cleaning is performed, so that the solvent included in the active material layer is removed. The cleaning is preferably performed using a solution given as the solvent contained in the reducing solution. The solution may be either the same as or different from the solvent contained in the reducing solution. The step is preferably performed in a reduced pressure atmosphere or a reduction atmosphere. For example, this step is preferably performed at 50° C. to 100° C. inclusive for 1 hour to 48 hours inclusive under reduced pressure. Thus, the polar solvent and water can be vaporized efficiently. This step can also facilitate the reduction of the graphene oxide.

Through the above steps, the graphene oxide is reduced, so that graphene can be formed on the surface of the active material.

Next, the other components in the storage battery electrode 100 are described.

The current collector 101 can be formed using a material which has high conductivity and is not alloyed with carrier ions such as lithium ions, e.g., a metal typified by stainless steel, gold, platinum, zinc, iron, copper, aluminum, titanium, or tantalum, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collector 101 can have a foil-like shape, a plate-like shape (sheet-like shape), a net-like shape, a punching-metal shape, an expanded-metal shape, or the like as appropriate. The current collector 101 preferably has a thickness greater than or equal to 10 µm and less than or equal to 30 µm.

The active material 103 is in the form of particles made of secondary particles having average particle diameter and particle diameter distribution, which is obtained in such a way that material compounds are mixed at a predetermined ratio and baked and the resulting baked product is crushed, granulated, and classified by an appropriate means. Therefore, the active materials 103 are schematically illustrated as spheres in FIG. 2C; however, the shape of the active materials 103 is not limited to this shape.

When a storage battery electrode is formed to be used as a positive electrode of a storage battery, a material into and from which lithium ions can be inserted and extracted can be used for the active material 103; for example, a lithium-containing complex phosphate, lithium-containing complex silicate, or lithium-manganese composite oxide each which have an olivine crystal structure, a layered rock-salt crystal structure, or a spinel crystal structure can be used.

As the lithium-containing complex phosphate with the olivine crystal structure, a composite phosphate represented by a general formula $LiMPO_4$ (Al is one or more of Fe(II), Mn(II), Co(II), and Ni(II)) can be given. Typical examples of $LiMPO_4$ (general formula) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it meets requirements with balance for an active material, such as safety, stability, high capacity density, high potential, and the existence of lithium ions that can be extracted in initial oxidation (charging).

Examples of the lithium-containing complex silicate with a layered rock-salt crystal structure include lithium cobalt oxide ($LiCoO_2$); $LiNiO_2$; $LiMnO_2$; $Li_2MnO_3$; an NiCo-based lithium-containing material (a general formula thereof is $LiNi_xCo_{1-x}O_2$ (0<x<1)) such as $LiNi_{0.8}Co_{0.2}O_2$; an NiMn-based lithium-containing material (a general formula thereof is $LiNi_xMn_{1-x}O_2$ (0<x<1)) such as $LiNi_{0.5}Mn_{0.5}O_2$; and an NiMnCo-based lithium-containing material (also referred to as NMC, and a general formula thereof is $LiNi_xMn_yCo_{1-x-y}O_2$ (x>0, y>0, x+y<1)) such as $LiNi_{1/3}Mn_{1/3}Co_{1/3}O_2$. Moreover, $Li(Ni_{0.8}Co_{0.15}Al_{0.05})O_2$, $Li_2MnO_3$-$LiMO_2$ (M=Co, Ni, or Mn), and the like can be given as the examples.

$LiCoO_2$ is particularly preferable because of its advantages such as high capacity and stability in the air higher than that of $LiNiO_2$ and thermal stability higher than that of $LiNiO_2$.

Further, a lithium-manganese composite oxide with a spinel crystal structure, such as $LiMn_2O_4$, $Li_{1+x}Mn_{2-x}O_4$, $Li(MnAl)_2O_4$, or $LiMn_{1.5}Ni_{0.5}O_4$, can be used.

A lithium-manganese composite oxide with a spinet crystal structure including manganese, such as $LiMn_2O_4$, is preferably mixed with a small amount of lithium nickel oxide (e.g., $LiNiO_2$ or $LiNi_{1-x}MO_2$ (M=Co, Al, or the like)), in which case elution of manganese and decomposition of an electrolyte solution are suppressed, for example.

Alternatively, a composite oxide expressed by $Li_{(2-j)}MSiO_4$ (general formula) (M is one or more of Fe(II), Mn(II), Co(II), and Ni(II), j=0, 1, 2) can be used as the active material. Typical examples of $Li_{(2-j)}MnSiO_4$ (general formula) are $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_oSiO_4$, $Li_{(2-j)}Ni_mCo_nMn_oSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the active material. Examples of the nasicon compound are $Fe_2(MnO_4)_3$, $Fe_2(SO_4)_3$, and $Li_3Fe_2(PO_4)_3$. Further alternatively, as the active material, a compound represented by a general formula $Li_2MPO_4F$, $Li_2MP_2O_7$, or $Li_5MO_4$ (M=Fe or Mn), perovskite fluoride such as $NaF_3$ or $FeF_3$, metal chalcogenide such as $TiS_2$ or $MoS_2$ (sulfide, selenide, or telluride), a lithium-containing composite vanadate with an inverse spinel crystal structure such as $LiMVO_4$, a vanadium oxide based material (e.g., $V_2O_5$, $V_6O_{13}$, and $LiV_3O_8$), a manganese oxide based material, an organic sulfur based material, or the like can be used.

In the case where carrier ions are alkali metal ions other than lithium ions or alkaline-earth metal ions, the active material particle may contain, instead of lithium in the lithium compound and the lithium-containing composite oxide, an alkali metal (e.g., sodium or potassium), an alkaline-earth metal (e.g., calcium, strontium, or barium, beryllium, or magnesium).

In the case where the storage battery electrode that is to be formed is used as a negative electrode, a carbon-based material, an alloy-based material, or the like can be used, for example, as the active material 103.

Examples of the carbon-based material include graphite, graphitizing carbon (soft carbon), non-graphitizing carbon (hard carbon), a carbon nanotube, graphene, and carbon black.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (higher than or equal to 0.1 V and lower than or equal to 0.3 V vs. $Li/Li^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, a material which enables charge-discharge reactions by an alloying reaction and a dealloying reaction with lithium can be used. For example, a material including at least one of Ga, Si, Al, Ge, Sn, Pb, Sb, Bi, Ag, Zn, Cd, In, and the like can be used. Such elements have higher capacity than carbon. In particular, silicon has a significantly high theoretical capacity of 1200 mAh/g. Examples of the alloy-based material using such elements include $Mg_2Si$, $Mg_2Ge$, $Mg_2Sn$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as tin monooxide (SnO), tin dioxide ($SnO_2$), titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), and molybdenum oxide ($MoO_2$), or $SnS_2$ can be used.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide with which au alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NtP_2$, $FeP_2$, and $CoP_3$, and fluorides such as $FeF_3$ and $BiF_3$.

As the binding agent (binder) included in the active material layer 102, instead of polyvinylidene fluoride (PVdF) as a typical one, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose or the like can be used.

As described in this embodiment, the graphene oxide is dispersed in a solution containing alcohol or acid and then heated under reduced pressure, whereby the dispersibility of graphene oxide is improved and a reduction reaction easily occurs. When the graphene oxide is reduced on the mild condition, graphene that has been improved in electric conductivity can be formed. With use of such graphene as a conductive additive, a storage battery electrode including an active material layer with high electric conductivity can be formed.

One embodiment of the present invention can be used for various power storage devices besides the storage battery. Examples of power storage devices include a battery, a primary battery, a secondary battery, a lithium-ion secondary battery, a lithium air battery, and a solid-state battery. In addition, a capacitor is given as another example of the power storage devices. For example, one embodiment of the present invention can be used for a capacitor such as a lithium-ion capacitor.

Graphene oxide can be used for the following components: an electrode for a supercapacitor that has extremely high capacitance; an oxygen-reduction electrode catalyst; a material of a dispersion liquid with lower friction than a lubricant; a transparent electrode for a display device or a solar battery; a gas-barrier material; a polymer material with high mechanical strength and lightweight; a material for a sensitive nanosensor for sensing uranium or plutonium contained in radiation-tainted water; and a material used for removing a radioactive material.

In this embodiment, one embodiment of the present invention has been described. Other embodiments of the present invention are described in embodiments below. Note that one embodiment of the present invention is not limited to the above examples. For example, although an example of including graphene or graphene oxide in an electrode has been described in one embodiment of the present invention, one embodiment of the present invention is not limited to this example. An electrode in one embodiment of the present invention may include a material other than graphene or graphene oxide depending on cases or conditions. For example, an electrode in one embodiment of the present invention does not necessarily include graphene or graphene oxide depending on cases or conditions.

This embodiment can be implemented in appropriate combination with any of the structures described in the other embodiments.

Embodiment 2

Figure 4:
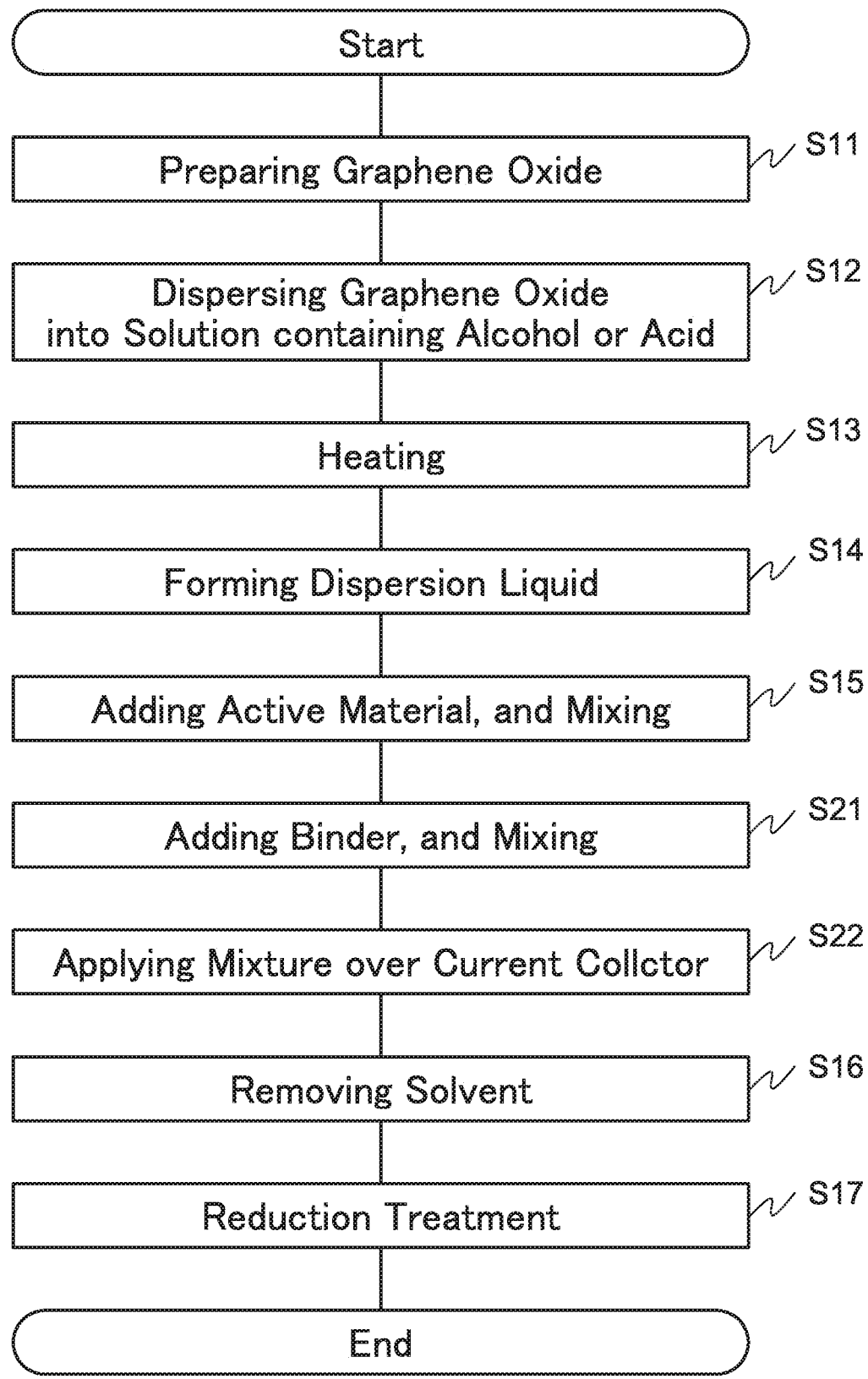
FIG. 4 is a flow chart showing a method for manufacturing an electrode according to one embodiment.

In this embodiment, a method for manufacturing a storage battery electrode of one embodiment of the present invention will be described with reference to FIG. 4. Specifically, a method for manufacturing the storage battery electrode 100 including the active material layer 102 illustrated in FIGS. 2A to 2C is described. The method includes a step of forming a mixture using an active material, graphene oxide, a binder, and a solvent, a step of applying the mixture on the current collector 101, and a step of reducing the graphene oxide.

Note that the manufacturing method described in Embodiment 1 can be referred to for preparing the graphene oxide (Step S11), dispersing the graphene oxide into a solution containing alcohol or acid (Step S12), and heating the graphene oxide under reduced pressure (Step S13).

After Step S13, the graphene oxide described in Embodiment 1 is dispersed in a solvent, and a graphene oxide dispersion liquid (third dispersion liquid) is formed (Step S14). In the case where the weight of the graphene oxide exceeds 10 wt %, although it depends on the diameter of the active material particle, the viscosity of the mixture is increased. In a heating step performed after the mixture containing the active material and the graphene oxide is applied to the current collector 101, convection is generated in the mixture and thin and lightweight graphene oxide moves and is aggregated, whereby a crack might be formed in the active material layer 102 or the active material layer 102 might be separated from the current collector 101. Thus, the weight of the graphene oxide may be higher than or equal to 0.2 wt % and lower than or equal to 10 wt % with respect to the total weight of the mixture. Note that the graphene oxide is reduced by a later heat treatment step to give the graphene and the weight is reduced by almost half, and consequently the weight ratio in the active material layer 102 becomes 0.1 wt % to 5 wt %, inclusive.

Next, an active material is added to the dispersion liquid made in Step S14 and mixed (Step S15). The average particle diameter of the primary particle of the active material is preferably greater than or equal to 50 nm and less than or equal to 500 nm. The weight of added active material is preferably higher than or equal to 85 wt % with respect to the total weight of the mixture; for example, the weight is higher than or equal to 85 wt % and lower than or equal to 95 wt %.

Note that carbohydrate such as glucose may be mixed at the time of baking the active material to coat a particle of the active material with carbon. This treatment can improve the conductivity.

Next, a mixture of the above is kneaded (mixing is performed in a highly viscous state), so that the cohesion of the graphene oxide and the active material can be weakened. The graphene oxide has a bulky functional group; thus, the graphene oxides are less likely to be aggregated. Hence, the graphene oxide can be further uniformly dispersed into the active material layer.

Next, a binder is added to this mixture (Step S21). The weight of the binder is determined depending on the weight of graphene oxide and that of the active material; the binder is added so that the weight ratio of the binder to the total of the mixture is higher than or equal to 1 wt % and lower than or equal to 20 wt %. The binder is added while the graphene oxide is uniformly dispersed to be in surface contact with the plurality of particles of the active material, so that the particles of the active material and the graphene oxide can be bound to each other with the graphene oxide kept dispersed. Although the binder is not necessarily added depending on the ratio of the active material and the graphene oxide, adding the binder can enhance the strength of the storage battery electrode.

Next, the solvent is added to the mixture until the mixture has a predetermined degree of viscosity, and mixed, so that a mixture is formed. Formation of the mixture in the above steps enables the graphene oxide, the active material, and the binder to be dispersed uniformly.

Here, an undercoat may be formed over the current collector. Note that the undercoat is a coating layer provided to reduce contact resistance or to improve adhesion between the current collector and the active material layer. Examples of the undercoat include a carbon layer, a metal layer, a layer containing carbon and high molecules, and a layer containing metal and high molecules. Forming the undercoat over the current collector can reduce the contact resistance between the current collector and the active material layer formed later. In addition, the adhesion between the current collector and the active material layer can be increased. In the case of using graphene as the conductive additive, the undercoat is preferably not dissolved by a reducing solution in the process of reducing graphene oxide. Note that in one embodiment of the present invention, the graphene oxide can be reduced at low temperature, i.e., thermal reduction can be preferably used. Thus, a material used for the undercoat is not influenced by a material of the reducing solution, and the range of choice of the material can be widened.

As the undercoat, for example, an aqueous solution in which graphite, acetylene black (AB), and the like are dispersed or the aqueous solution into which high molecules are mixed can be used. Examples of the undercoat include a mixture of graphite and sodium polyacrylate (PAA) and a mixture of AB and PVdF. The compounding ratio of black lead to PAA is preferably 95:5 to 50:50, and the compounding ratio of AB to PVdF is preferably 70:30 to 50:50.

Note that if there is no problem with the adhesion between the current collector and the active material layer, the electrode strength, and the contact resistance, it is not necessary to apply the undercoat to the current collector.

Next, over the current collector 101, the mixture of the active material, the graphene oxide, the binder, and the solvent is applied (Step S22).

Next, with respect to the mixture applied on the current collector, the removal of the solvent (Step S16) and the reduction (Step S17) are performed. As Step S16 and Step S17, the steps described in Embodiment 1 can be employed.

Through the above steps, the storage battery electrode 100 including the active material layer 102 where the graphenes 104 are evenly dispersed to the active material 103 can be formed. After the step of removing the solvent, a step of applying pressure may be performed on the storage battery electrode 100.

As described in this embodiment, an active material is added to the solvent in which the graphene oxides including an alkyl group supported by an ether bond or an ester bond are dispersed and mixed, so that the graphene oxides can be dispersed uniformly in the active material layer. With use of the active material layer formed in the above-described manner, a storage battery electrode with high electron conductivity can be formed. Furthermore, when an electrode is formed using the storage battery electrode, a storage battery with high capacity can be formed.

This embodiment can be implemented in appropriate combination with any of the structures described in the other embodiments.

Embodiment 3

Figure 5:
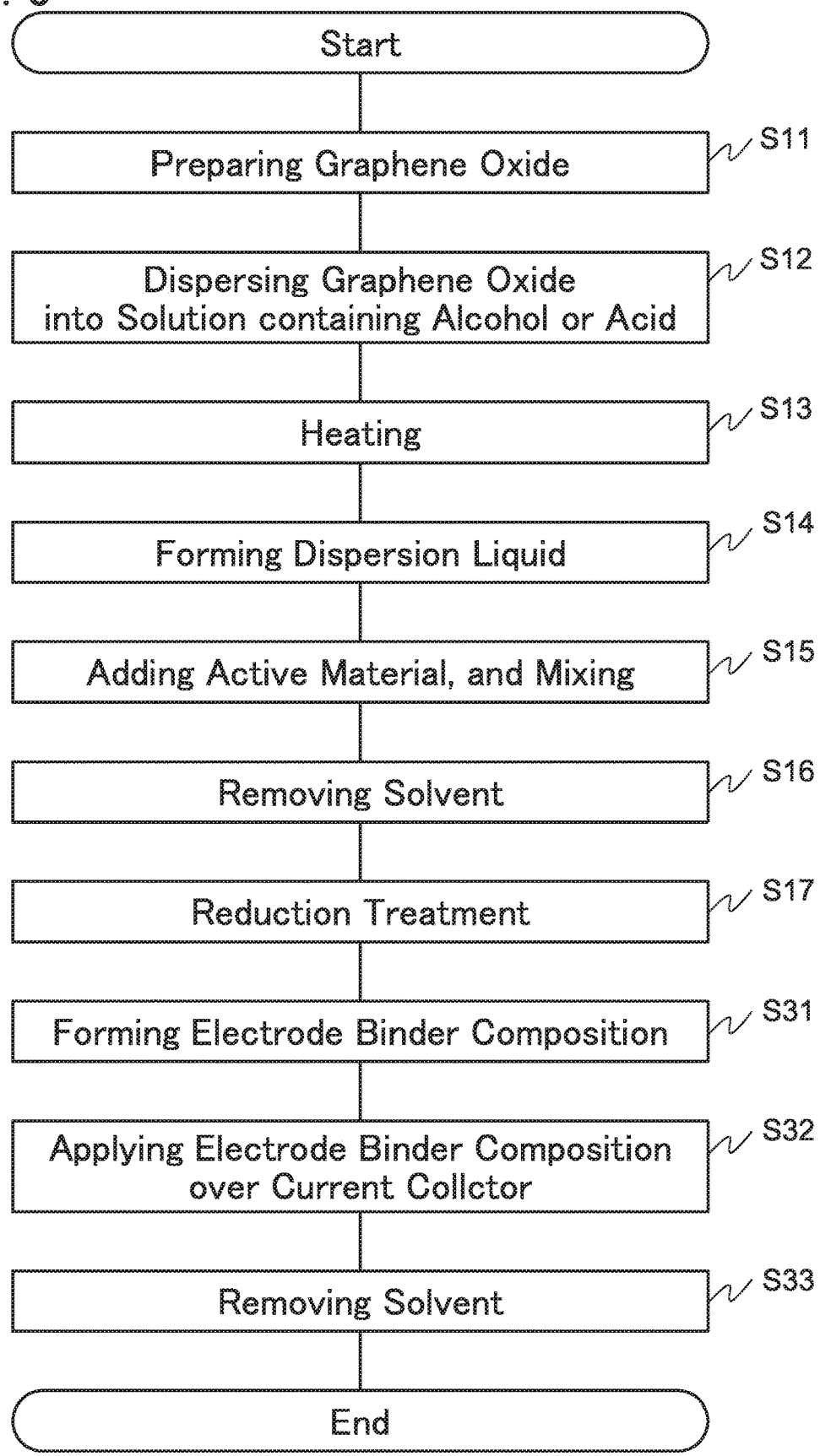
FIG. 5 is a flow chart showing a method for manufacturing an electrode according to one embodiment.

In this embodiment, a method for manufacturing a storage battery electrode of one embodiment of the present invention will be described with reference to FIG. 5. Specifically, a surface of an active material is coated with graphene oxide, and the graphene oxide is reduced. After that, with use of the active material including graphene, a conductive additive, a binder, and a solvent, a composition containing a solvent used for formation of the active material layer 102 (the composition is also referred to as electrode binder composition) is formed. Next, a method for manufacturing a storage battery electrode 100 including the active material layer 102 illustrated in FIGS. 2A to 2C, in which the electrode binder composition is applied on the current collector 101, is described.

Note that the steps described in Embodiment 1 can be employed for a step of preparing graphene oxide (Step S11), a step of dispersing the graphene oxide into a solution containing alcohol or acid (Step S12), and a step of heat treatment (Step S13).

After Step S13, the graphene oxide and the solvent are put into a mixer, and a graphene oxide dispersion liquid (third dispersion liquid) is formed (Step S14). At this time, the weight of the graphene oxide is preferably higher than or equal to 0.5 wt % and lower than or equal to 5 wt %. When the weight of the graphene oxide is lower than 0.5 wt %, it is difficult to cover the surface of the active material. When the weight of the graphene oxide is higher than 5 wt %, the electrode volume is increased, and the weight of electrode is increased.

Next, as shown in Step S15, the active material is added to the dispersion liquid, and kneading is performed. Note that kneading means mixing something until it has a high viscosity. The kneading can weaken cohesion of the active material. The graphene oxide has a bulky functional group; thus, the graphene oxides are less likely to be aggregated. Hence, the graphene oxide and the active material can be further uniformly dispersed.

Next, as shown in Step S16, the solvent contained in the mixture of the graphene oxide and the active material (the mixture is also referred to as first mixture) is removed, and then grinding is performed, so that the active material covered with the grapheme oxide is obtained.

Next, reduction treatment of the graphene oxide is performed as shown in Step S17. For Step S17, the step described in Step S17 can be employed.

In Step S17, the graphene oxide is reduced, and the active material covered with graphene (the material is also referred to as second mixture) can be formed. Note that oxygen in graphene oxide is not necessarily entirely removed and may remain partly in the graphene.

Next, an electrode binder composition (also referred to as third mixture) is formed (Step S31). For formation of the electrode binder composition, a binder, a conductive additive, and the like are added to the above active material, and mixed with the solvent. The electrode binder composition may be in a slurry form or a paste form. As the solvent, for example, water or NMP can be used. Water is preferably used in terms of the safety and cost.

The case where the storage battery electrode 100 is a positive electrode of a storage battery will be described as an example. Described here is an example where the active material including graphene of one embodiment of the present invention is used, acetylene black is used as a conductive additive, PVdF is used as a binder, and NMP is used as a solvent.

First, the active material of one embodiment of the present invention, acetylene black, and PVdF are mixed. Then, NMP is added to the obtained mixture and mixed until a predetermined degree of viscosity is obtained; thus, the electrode binder composition can be formed. In this step, the mixing and the addition of the polar solvent may be repeated more than once.

Through the above steps, the electrode binder composition in which the active material, the conductive additive, and the binder are uniformly mixed can be obtained.

Next, the electrode binder composition is provided on one or both surfaces of the current collector by a coating method such as a doctor blade method (Step S32).

Next, the solvent contained in the electrode binder composition provided over the current collector is removed by ventilation drying, reduced pressure drying, or the like (Step S33). This step is preferably performed using, for example, a hot wind at a temperature higher than or equal to 50° C. and lower than or equal to 180° C. Through this step, the polar solvent contained in the active material layer is vaporized. There is no particular limitation on the atmosphere.

The active material layer may be pressed by a compression method such as a roll press method or a flat plate press method so as to be densified. Further, by applying heat higher than or equal to 90° C. and lower than or equal to 180° C., preferably lower than or equal to 120° C. when the pressing is performed, the binder (e.g., PVdF) contained in the undercoat or the active material layer is softened to the extent such that the characteristics of the electrode is not changed; thus, the adhesion between the current collector and the active material layer can be further increased.

Then, the pressed active material layer is heated. The heating is preferably performed under a reduced pressure or in a reduction atmosphere. This drying step may be performed at temperatures higher than or equal to 50° C. and lower than or equal to 300° C. for an hour to 48 hours inclusive, for example. The step allows sufficient evaporation of the polar solvent and moisture in the active material layer.

Moreover, the active material layer may be further pressed. Thus, the adhesion between the current collector and the active material layer can be increased. In addition, the active material layer can be consolidated. Furthermore, by applying heat higher than or equal to 90° C. and lower than or equal to 180° C., preferably lower than or equal to 120° C. when the pressing is performed, the hinder (e.g., PVdF) contained in the undercoat or the active material layer is softened to the extent such that the characteristics of the electrode is not changed; thus, the adhesion between the current collector and the active material layer can be further increased.

Through the above steps, the storage battery electrode 100 including the active material layer 102 where the graphenes 104 are evenly dispersed to the active material 103 can be formed. In addition, the current collector and the active material layer are shaped into predetermined shapes, whereby an electrode is formed.

Graphene has excellent electrical characteristics of high conductivity and excellent physical properties of high flexibility and high mechanical strength. Thus, when an electrode including an active material a surface of which is provided with graphene is used for a battery, the active material can be prevented from being cleaved and cracked due to volume change even when the active material is expanded and contracted, which is caused by charge-discharge of the battery performed repeatedly.

Moreover, the pressure applied to the active material can be moderated by mechanical strength of graphene when the electrode is pressed in a step of manufacturing an electrode. Thus, the active material can be prevented from being cleaved and cracked.

Furthermore, the active material can be prevented from being cleaved and cracked even when such a great stress is applied to the electrode.

When the active material the surface of which is provided with graphene is used for an electrode as described above, a decrease in the voltage and discharge capacity of a battery can be prevented. Accordingly, the charge-discharge cycle characteristics of the battery can be improved.

This embodiment can be implemented in appropriate combination with any of the structures described in the other embodiments.

Embodiment 4

In this embodiment, examples of the structure of a storage battery using electrodes for a storage battery formed by the manufacturing method described in Embodiment 1 will be described with reference to FIGS. 11A and 11B, FIG. 12, and FIGS. 13A and 13B.

(Coin-Type Storage Battery)

Figure 11A:
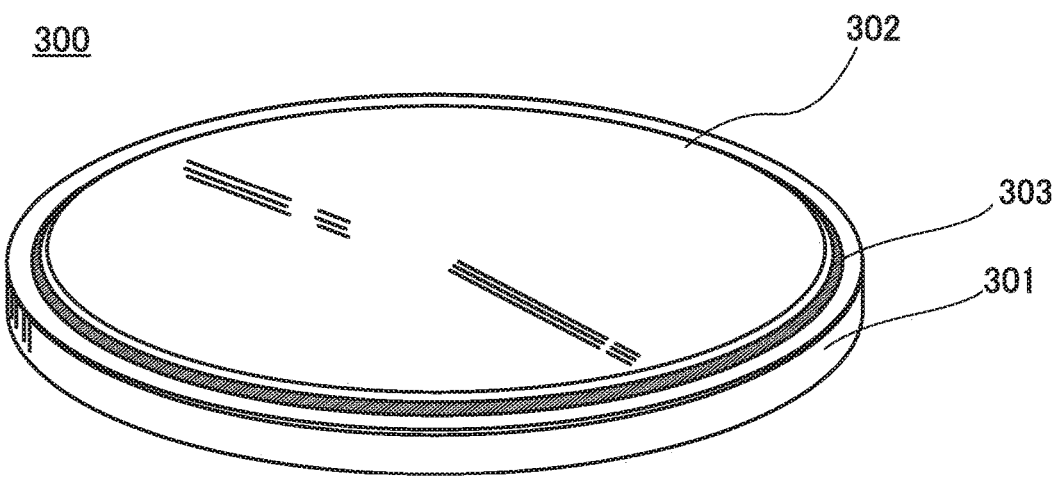
FIGS. 11A and 11B illustrate a coin-type storage battery.
Figure 11B:
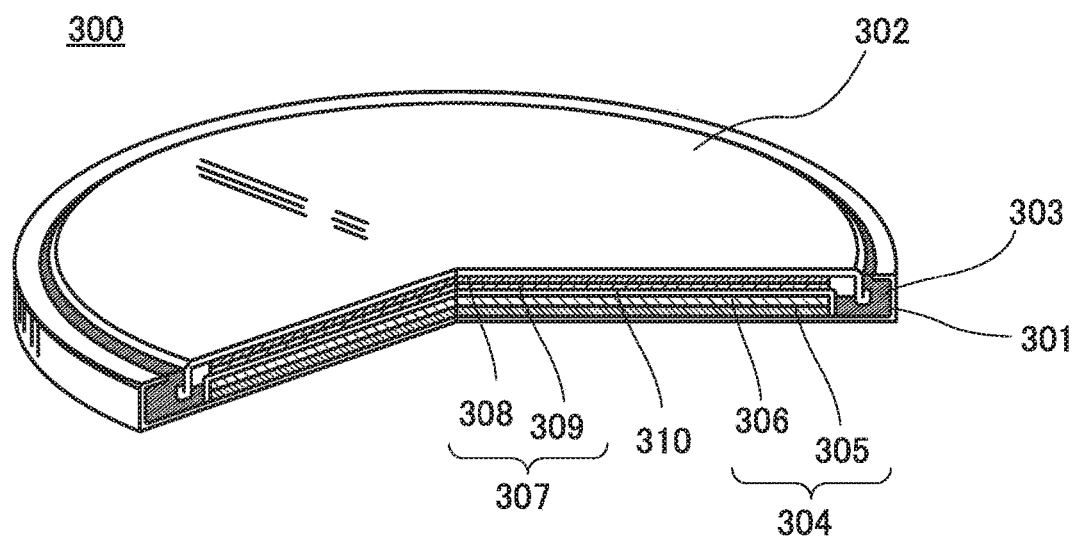

FIG. 11A is an external view of a coin-type (single-layer flat type) storage battery, and FIG. 11B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308. A separator 310 and an electrolytic solution (not illustrated) are provided between the positive electrode active material layer 306 and the negative electrode active material layer 309.

For at least one of the positive electrode 304 and the negative electrode 307, the storage battery electrode formed by the method for forming a storage battery electrode of one embodiment of the present invention, which is described in Embodiment 1, can be used.

As the separator 310, an insulator including pores, such as cellulose (paper), polyethylene, or polypropylene can be used.

As an electrolyte, a solid electrolyte, an electrolytic solution containing a supporting electrolyte, or a gel electrolyte obtained by gelation of part of an electrolytic solution can be used.

As a supporting electrolyte, a material which contains carrier ions can be used. Typical examples of the supporting electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

Note that when carrier ions are alkali metal ions other than lithium ions or alkaline-earth metal ions, instead of lithium in the above lithium salts, an alkali metal (e.g., sodium or potassium), an alkaline-earth metal (e.g., calcium, strontium, barium, beryllium, magnesium, or the like) may be used for the electrolyte.

As a solvent of the electrolytic solution, a material in which carrier ions can move can be used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent for the electrolytic solution, safety against liquid leakage and the like is improved. Further, the storage battery can be thinner and more lightweight. Typical examples of the gelled high-molecular material include a silicone gel, an acrylic gel, an acrylonitrile gel, a polyethylene oxide)-based gel, a polypropylene oxide)-based gel, a gel of a fluorine-based polymer, and the like.

Alternatively, the use of one or more of ionic liquids (particularly, room temperature molten salts) which have features of non-flammability and non-volatility as a solvent of the electrolytic solution can prevent the storage battery from exploding or catching fire even when the storage battery internally shorts out or the internal temperature increases owing to overcharging or the like. An ionic liquid contains a cation and an anion. Examples of an organic cation included in an ionic liquid include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. In the case of using the solid electrolyte, a separator or a spacer is not necessary. Further, the battery can be entirely solidified; therefore, there is no possibility of liquid leakage and thus the safety of the battery is dramatically increased.

For the positive electrode can 301 and the negative electrode can 302, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 11B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

(Laminated Storage Battery)

Figure 12:
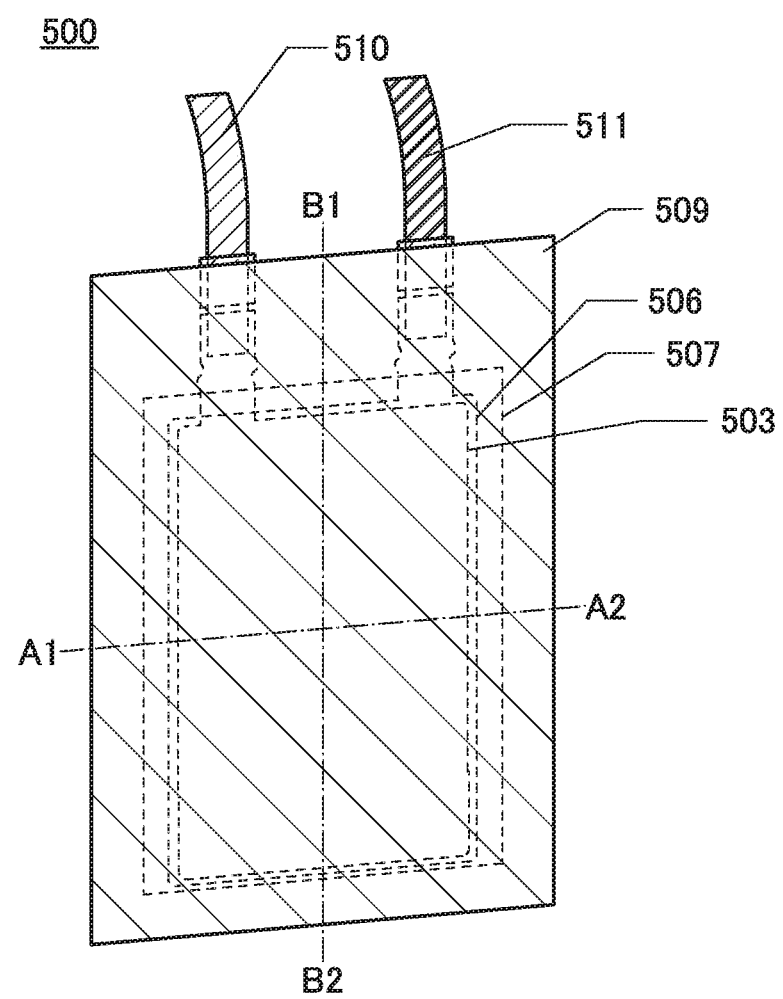
FIG. 12 illustrates a laminated storage battery.
Figure 13A:
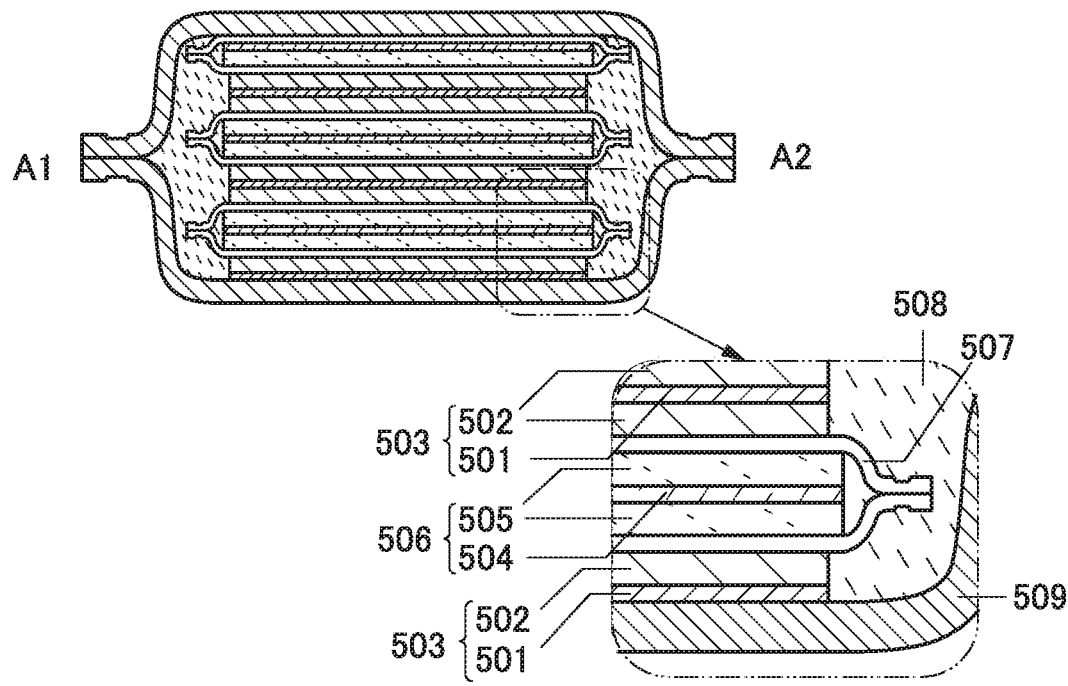
FIGS. 13A and 13B each illustrate a laminated storage battery.
Figure 13B:
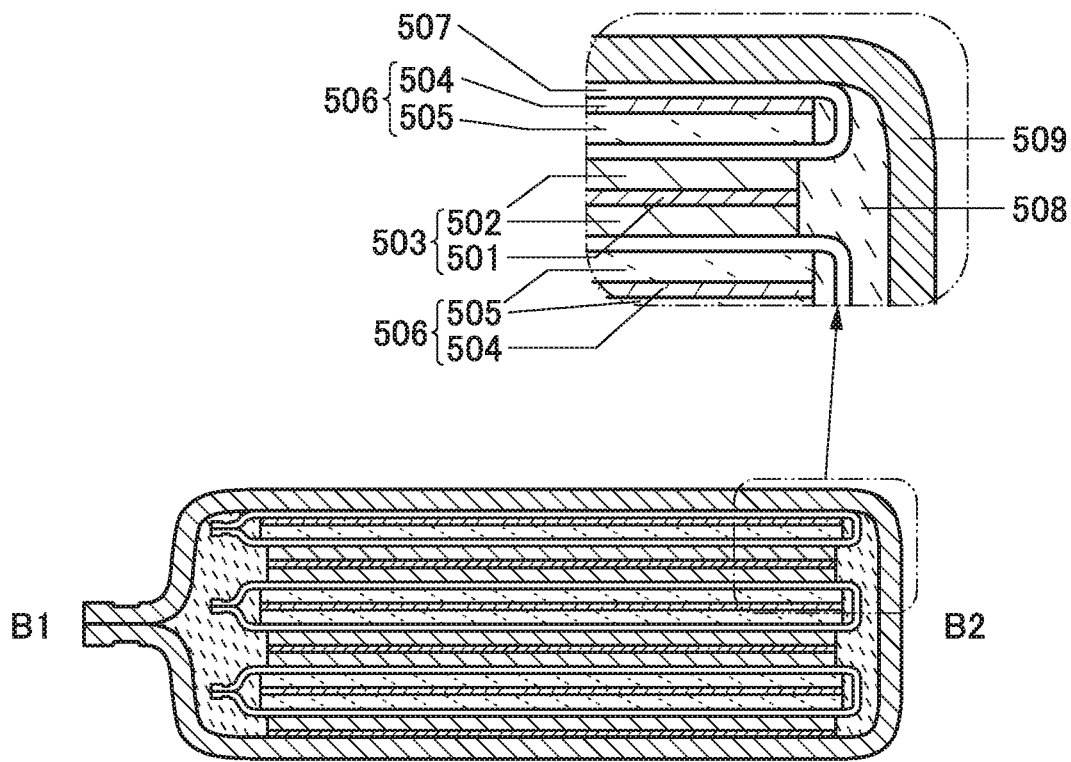

FIG. 12 is an external view of a laminated storage battery 500. FIGS. 13A and 13B are cross-sectional views along dashed dotted lines A1-A2 and B1-B2 in FIG. 12, respectively. The laminated storage battery 500 is formed with a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506. The electrolytic solution 508 is provided in the region surrounded by the exterior body 509.

A laminated battery 500 illustrated in FIG. 12 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the region surrounded by the exterior body 509, The electrolytic solution 508 is provided in the region surrounded by the exterior body 509.

In the laminated storage battery 500 illustrated in FIG. 12, the positive electrode current collector 501 and the negative electrode current collector 504 also serve as terminals for an electrical contact with an external portion. For this reason, each of the positive electrode current collector 501 and the negative electrode current collector 504 is provided so as to be partly exposed on the outside of the exterior body 509.

As the exterior body 509 in the laminated storage battery 500, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of an electrolytic solution and a gas can be blocked and an insulating property and resistance to the electrolytic solution can be obtained.

(Cylindrical Storage Battery)

Figure 14A:
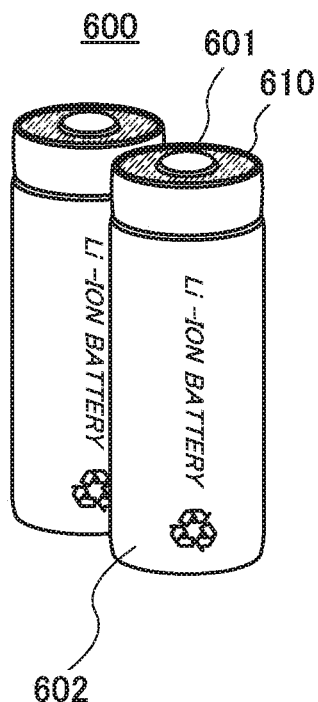
FIGS. 14A and 14B illustrate a cylindrical storage battery.

Next, an example of a cylindrical storage battery will be described with reference to FIGS. 14A and 14B. As illustrated in FIG. 14A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 14B:
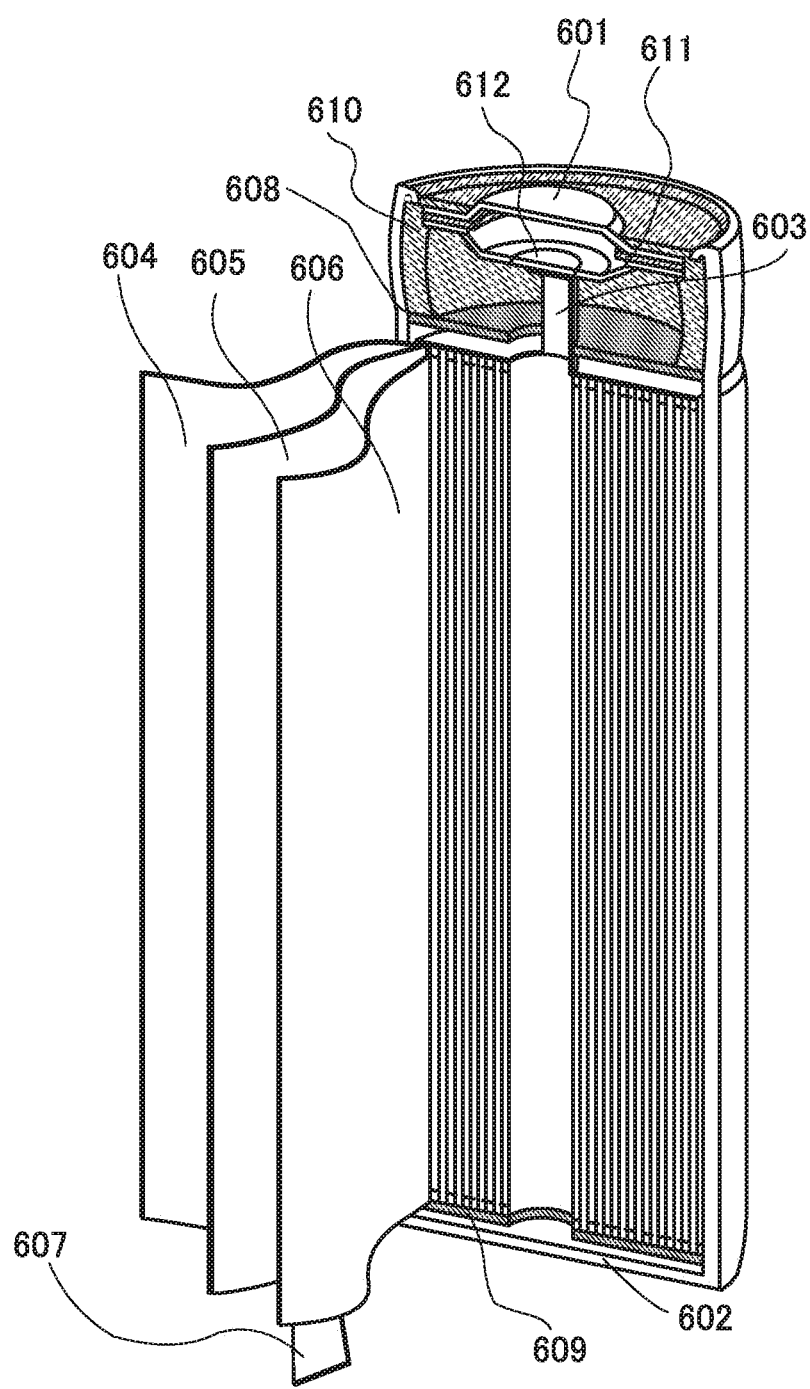

FIG. 14B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a separator 605 interposed therebetween is provided. Although not illustrated, the battery element is wound around a center pin. One end of the battery can 602 is close and the other end thereof is open. For the battery can 602, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. Inside the battery can 602, the battery element in which the positive electrode, the negative electrode, and the separator are wound is interposed between a pair of insulating plates 608 and 609 which face each other. Further, a nonaqueous electrolytic solution (not illustrated) is injected inside the battery can 602 provided with the battery element. As the nonaqueous electrolytic solution, a nonaqueous electrolytic solution which is similar to those of the above coin-type storage battery and the laminated storage battery can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. Further, the PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or rolled may be employed.

As the positive electrodes and the negative electrodes of the coin-type storage battery 300, the storage battery 500, and the storage battery 600, which are described in this embodiment, electrodes formed by the method for forming a storage battery electrode of one embodiment of the present invention are used. Thus, the discharge capacity of the coin-type storage battery 300, and the storage batteries 500 and 600 can be increased.

This embodiment can be implemented in appropriate combination with any of the structures described in the other embodiments.

Embodiment 5

A storage battery including the storage battery electrode of one embodiment of the present invention can be used for power supplies of a variety of electronic devices driven by electric power.

Specific examples of electrical devices each using the power storage device including a storage battery electrode of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, mobile phones, car phones, portable game machines, calculators, portable information terminals, electronic notebooks, e-book readers, electronic translators, audio input devices, video cameras, digital still cameras, toys, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools such as chain saws, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by electric motors using electric power from the storage batteries are also included in the category of electronic devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the electronic devices, the storage battery including the storage battery electrode of one embodiment of the present invention can be used as a main power supply for supplying enough electric power for almost the whole power consumption. Alternatively, in the electronic devices, the storage battery including the storage battery electrode of one embodiment of the present invention can be used as an uninterruptible power supply which can supply electric power to the electronic devices when the supply of electric power from the main power supply or a commercial power supply is stopped. Still alternatively, in the electronic devices, the storage battery including the storage battery electrode of one embodiment of the present invention can be used as an auxiliary power supply for supplying electric power to the electronic devices at the same time as the power supply from the main power supply or a commercial power supply.

Figure 15:
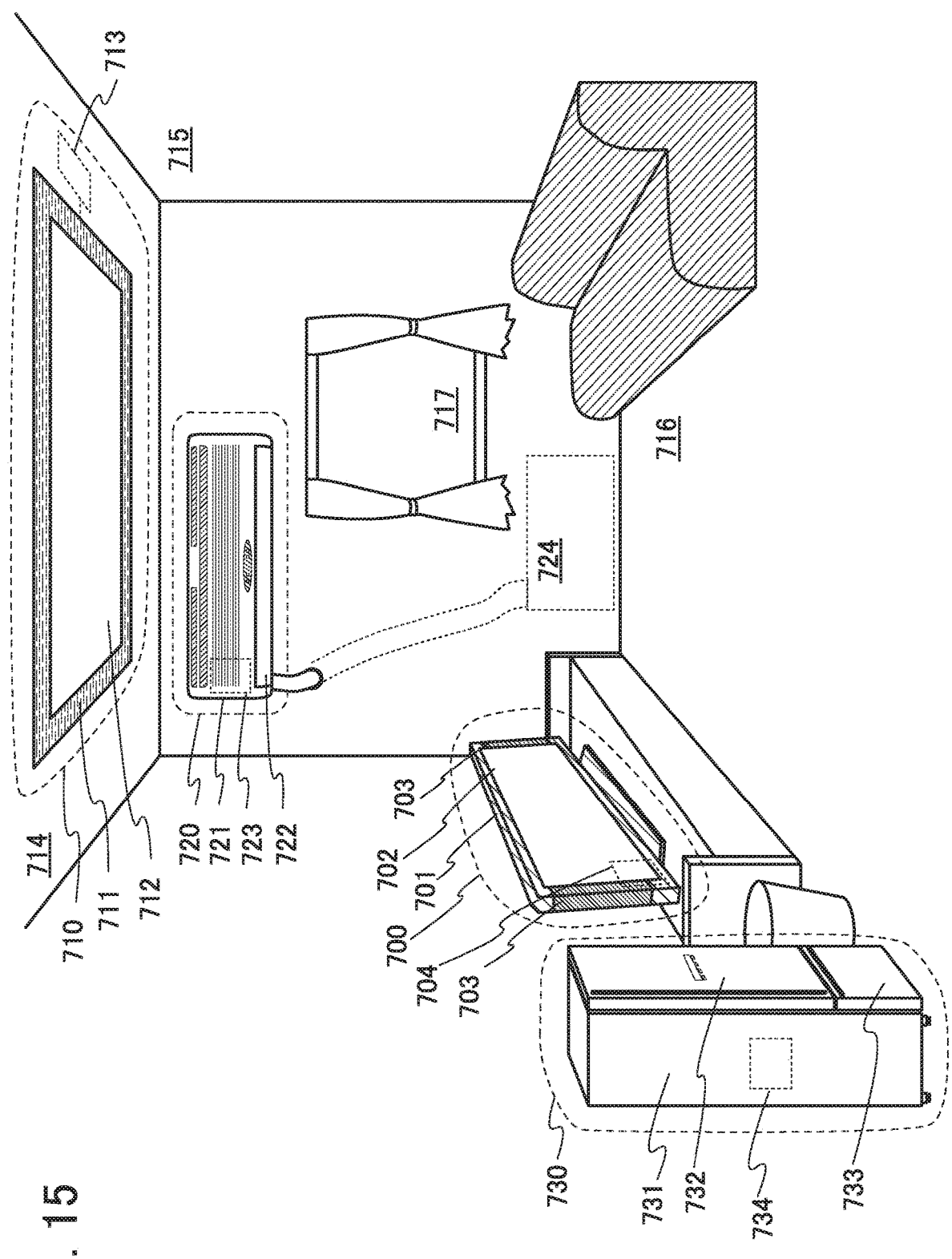
FIG. 15 illustrates examples of electronic devices.

FIG. 15 illustrates specific structures of the electronic devices. In FIG. 15, a display device 700 is an example of an electronic device including a storage battery 704 including the storage battery electrode of one embodiment of the present invention. Specifically, the display device 700 corresponds to a display device for TV broadcast reception and includes a housing 701, a display portion 702, speaker portions 703, and the storage battery 704. The storage battery 704 including the storage battery electrode of one embodiment of the present invention is provided in the housing 701. The display device 700 can receive electric power from a commercial power supply. Alternatively, the display device 700 can use electric power stored in the storage battery 704. Thus, the display device 700 can be operated with use of the storage battery 704 including the storage battery electrode of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 702.

Note that the display device includes, in its category, all of information display devices for personal computers, advertisement displays, and the like besides TV broadcast reception.

In FIG. 15, an installation lighting device 710 is an example of an electronic device including a storage battery 713 including the storage battery electrode of one embodiment of the present invention. Specifically, the lighting device 710 includes a housing 711, a light source 712, and the storage battery 713. Although FIG. 15 illustrates the case where the storage battery 713 is provided in a ceiling 714 on which the housing 711 and the light source 712 are installed, the storage battery 713 may be provided in the housing 711. The lighting device 710 can receive electric power from a commercial power supply. Alternatively, the lighting device 710 can use electric power stored in the storage battery 713. Thus, the lighting device 710 can be operated with the use of storage battery 713 including the storage battery electrode of one embodiment of the present invention as an uninterruptible power supply even when electric power cannot be supplied from a commercial power supply due to power failure or the like.

Note that although the installation lighting device 710 provided in the ceiling 714 is illustrated in FIG. 15 as an example, the storage battery including the storage battery electrode of one embodiment of the present invention can be used in an installation lighting device provided in, for example, a wall 715, a floor 716, a window 717, or the like other than the ceiling 714. Alternatively, the storage battery including the storage battery electrode of one embodiment of the present invention can be used in a tabletop lighting device or the like.

As the light source 712, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 15, an air conditioner including an indoor unit 720 and an outdoor unit 724 is an example of an electronic device including a storage battery 723 including the storage battery electrode of one embodiment of the present invention. Specifically, the indoor unit 720 includes a housing 721, an air outlet 722, and the storage battery 723. Although FIG. 15 illustrates the case where the storage battery 723 is provided in the indoor unit 720, the storage battery 723 may be provided in the outdoor unit 724. Alternatively, the secondary batteries 723 may be provided in both the indoor unit 720 and the outdoor unit 724. The air conditioner can receive electric power from a commercial power supply. Alternatively, the air conditioner can use electric power stored in the storage battery 723. Particularly in the case where the storage batteries 723 are provided in both the indoor unit 720 and the outdoor unit 724, the air conditioner can be operated with use of the storage battery 723 including the storage battery electrode of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 15 as an example, the storage battery including the storage battery electrode of one embodiment of the present invention can be used in an air conditioner in which the functions of an indoor unit and an outdoor unit are integrated in one housing.

In FIG. 15, an electric refrigerator-freezer 730 is an example of an electrical device including a storage battery 734 including the storage battery electrode of one embodiment of the present invention. Specifically, the electric refrigerator-freezer 730 includes a housing 731, a door for a refrigerator 732, a door for a freezer 733, and the storage battery 734. The storage battery 734 is provided in the housing 731 in FIG. 15. The electric refrigerator-freezer 730 can receive electric power from a commercial power supply. Alternatively, the electric refrigerator-freezer 730 can use electric power stored in the storage battery 734. Thus, the electric refrigerator-freezer 730 can be operated with use of the storage battery 734 including the storage battery electrode of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the storage battery including the storage battery electrode of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the storage battery, whereby the usage rate of electric power can be reduced in a time period when the electronic devices are used. For example, in the case of the electric refrigerator-freezer 730, electric power can be stored in the storage battery 734 in night time when the temperature is low and the door for a refrigerator 732 and the door for a freezer 733 are not often opened or closed. Then, in daytime when the temperature is high and the door for a refrigerator 732 and the door for a freezer 733 are frequently opened and closed, the storage battery 734 is used as an auxiliary power supply; thus, the usage rate of electric power in daytime can be reduced.

This embodiment can be implemented in combination with any of the other embodiments as appropriate.

Embodiment 6

The portable information terminal which is an example of electronic devices is described with reference to FIGS. 16A to 16C.

Figure 16A:
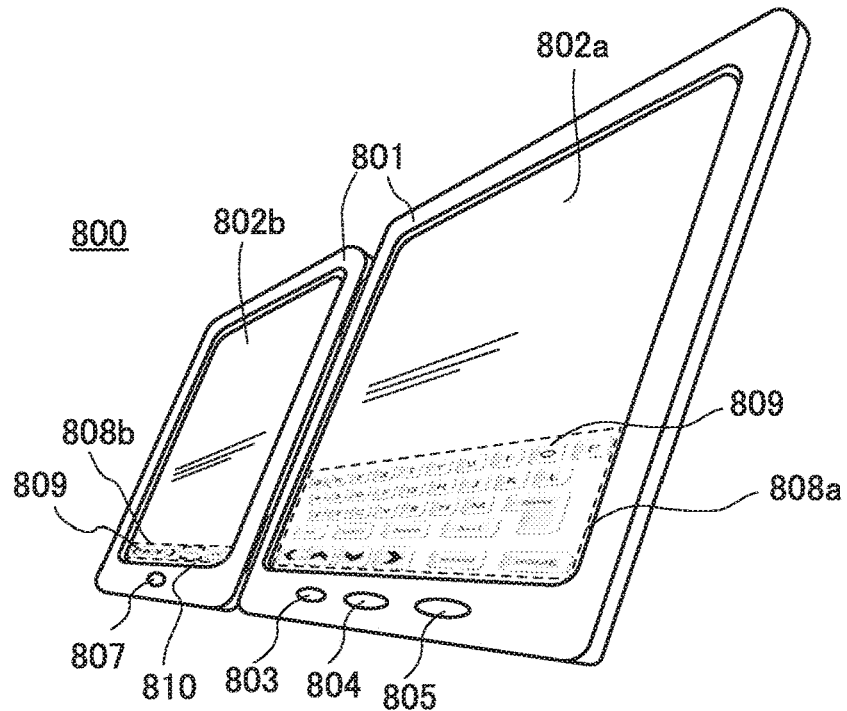
FIGS. 16A to 16C illustrate an example of an electronic device.
Figure 16B:
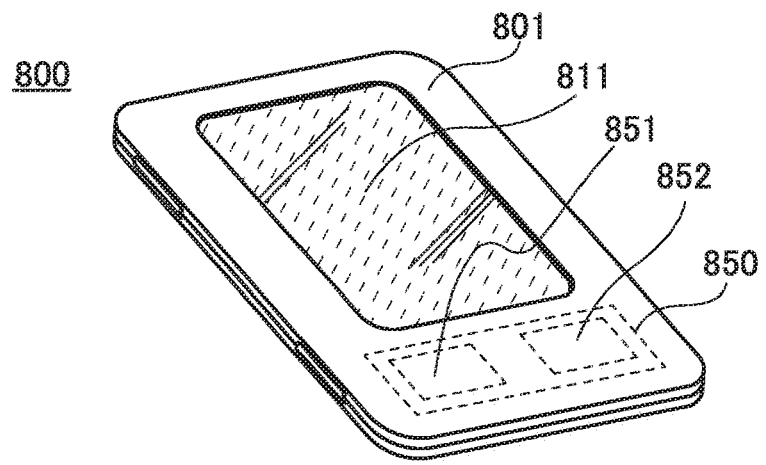

FIGS. 16A and 16B illustrate a tablet terminal 800 which can be folded. In FIG. 16A, the tablet terminal 800 is opened, and includes a housing 801, a display portion 802a, a display portion 802b, a switch 803 for switching display modes, a power switch 804, a switch 805 for switching to power-saving mode, and an operation switch 807.

A touch panel area 808a can be provided in part of the display portion 802a, in which area, data can be input by touching displayed operation keys 809. Note that half of the display portion 802a has only a display function and the other half has a touch panel function. However, the structure of the display portion 802a is not limited to this, and all the area of the display portion 802a may have a touch panel function. For example, a keyboard can be displayed on the whole display portion 802a to be used as a touch panel, and the display portion 802b can be used as a display screen.

A touch panel area 808b can be provided in part of the display portion 802b like in the display portion 802a. When a keyboard display switching button 810 displayed on the touch panel is touched with a finger, a stylus, or the like, a keyboard can be displayed on the display portion 802b.

The touch panel area 808a and the touch panel area 808b can be controlled by touch input at the same time.

The switch 803 for switching display modes allows switching between a landscape mode and a portrait mode, color display and black-and-white display, and the like. The switch 805 for switching to power-saving mode allows optimizing the display luminance in accordance with the amount of external light in use which is detected by an optical sensor incorporated in the tablet terminal. In addition to the optical sensor, other detecting devices such as sensors for determining inclination, such as a gyroscope or an acceleration sensor, may be incorporated in the tablet terminal.

Note that FIG. 16A illustrates an example in which the display portion 802a and the display portion 802b have the same display area; however, without limitation thereon, one of the display portions may be different from the other display portion in size and display quality. For example, one of the display portions 802a and 802b may display higher definition images than the other.

FIG. 16B illustrates the tablet terminal 800 in the state of being closed. The tablet terminal 800 includes the housing 801, a solar cell 811, a charge/discharge control circuit 850, a battery 851, and a DC-DC converter 852. FIG. 16B illustrates an example where the charge/discharge control circuit 850 includes the battery 851 and the DC-DC converter 852. The storage battery including the storage battery electrode of one embodiment of the present invention, which is described in the above embodiment, is used as the battery 851.

Since the tablet terminal 800 can be folded, the housing 801 can be closed when the tablet terminal is not in use. Thus, the display portions 802a and 802b can be protected, which permits the tablet terminal 800 to have high durability and improved reliability for long-term use.

The tablet terminal illustrated in FIGS. 16A and 16B can have other functions such as a function of displaying various kinds of data (e.g., a still image, a moving image, and a text image), a function of displaying a calendar, a date, the time, or the like on the display portion, a touch-input function of operating or editing the data displayed on the display portion by touch input, and a function of controlling processing by various kinds of software (programs).

The solar cell 811, which is attached on a surface of the tablet terminal, can supply electric power to a touch panel, a display portion, an image signal processor, and the like.

Note that the solar cell 811 can be provided on one or both surfaces of the housing 801 and thus the battery 851 can be charged efficiently.

The structure and operation of the charge/discharge control circuit 850 illustrated in FIG. 16B will be described with reference to a block diagram of FIG. 16C. FIG. 16C illustrates the solar cell 811, the battery 851, the DC-DC converter 852, a converter 853, switches SW1 to SW3, and the display portion 802. The battery 851, the DC-DC converter 852, the converter 853, and the switches SW1 to SW3 correspond to the charge/discharge control circuit 850 in FIG. 16B.

First, an example of operation in the case where electric power is generated by the solar cell 811 using external light will be described. The voltage of electric power generated by the solar cell is raised or lowered by the DC-DC converter 852 so that the electric power has a voltage for charging the battery 851. When the display portion 802 is operated with the electric power from the solar cell 811, the switch SW1 is turned on and the voltage of the electric power is raised or lowered by the converter 853 to a voltage needed for operating the display portion 802. In addition, when display on the display portion 802 is not performed, the switch SW1 is turned off and the switch SW2 is turned on so that the battery 851 may be charged.

Although the solar cell 811 is described as an example of power generation means, there is no particular limitation on the power generation means, and the battery 851 may be charged with any of the other means such as a piezoelectric element or a thermoelectric conversion element (Peltier element). For example, the battery 851 may be charged with a non-contact power transmission module capable of performing charging by transmitting and receiving electric power wirelessly (without contact), or any of the other charge means used in combination.

Figure 16C:
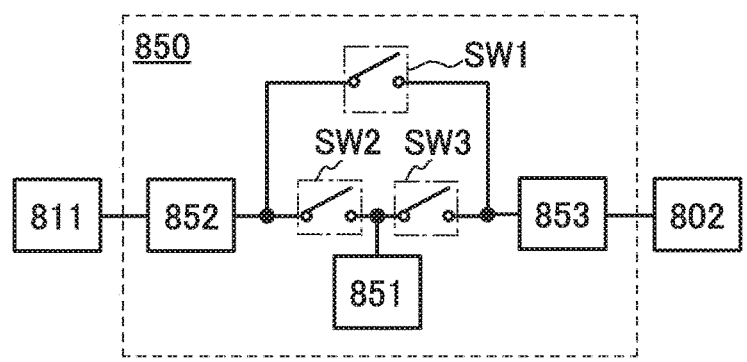

It is needless to say that one embodiment of the present invention is not limited to the electronic device illustrated in FIGS. 16A to 16C as long as the electronic device is equipped with the storage battery including the storage battery electrode of one embodiment of the present invention, which is described in the above embodiment.

Embodiment 7

Furthermore, an example of the moving object which is an example of electronic device will be described with reference to FIGS. 17A and 17B.

The storage battery described in the above embodiment can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 17A:
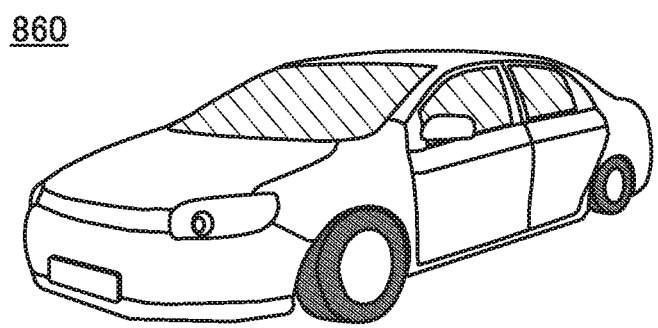
FIGS. 17A and 17B illustrate an example of an electronic device.
Figure 17B:
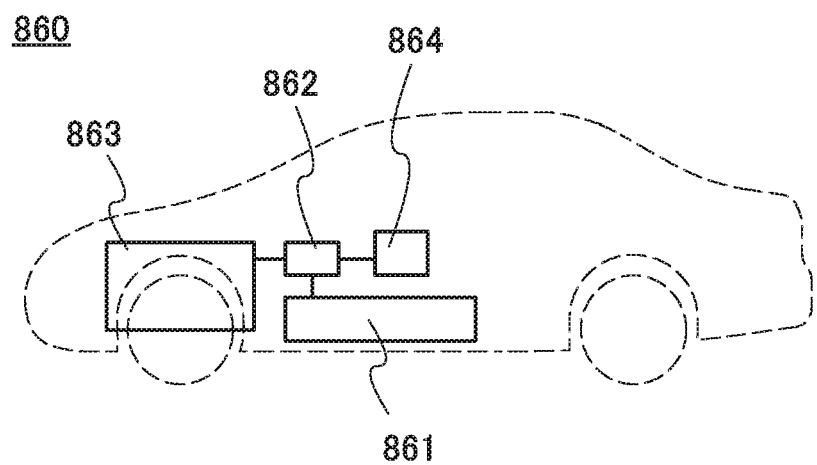

FIGS. 17A and 17B illustrate an example of an electric vehicle. An electric vehicle 860 is equipped with a battery 861. The output of the electric power of the battery 861 is adjusted by a control circuit 862 and the electric power is supplied to a driving device 863. The control circuit 862 is controlled by a processing unit 864 including a ROM, a RAM, a CPU, or the like which is not illustrated.

The driving device 863 includes a DC motor or an AC motor either alone or in combination with an internal-combustion engine. The processing unit 864 outputs a control signal to the control circuit 862 based on input data such as data on operation (e.g., acceleration, deceleration, or stop) of a driver or data during driving (e.g., data on an upgrade or a downgrade, or data on a load on a driving wheel) of the electric vehicle 860. The control circuit 862 adjusts the electric energy supplied from the battery 861 in accordance with the control signal of the processing unit 864 to control the output of the driving device 863. In the case where the AC motor is mounted, although not illustrated, an inverter which converts direct current into alternate current is also incorporated.

The battery 861 can be charged by external electric power supply using a plug-in technique. For example, the battery 861 is charged through a power plug from a commercial power supply. The battery 861 can be charged by converting the supplied power into DC constant voltage having a predetermined voltage level through a converter such as an AC-DC converter. The use of the storage battery including the storage battery electrode of one embodiment of the present invention as the battery 861 can contribute to an increase in battery capacity, leading to an improvement in convenience. When the battery 861 itself can be more compact and more lightweight as a result of improved characteristics of the battery 861, the vehicle can be lightweight, leading to an increase in fuel efficiency.

Note that it is needless to say that one embodiment of the present invention is not limited to the electronic device described above as long as the storage battery of one embodiment of the present invention is included.

This embodiment can be implemented in combination with any of the other embodiments as appropriate.

Example 1

One embodiment of the present invention is specifically described below with examples. This example shows results of formation of a positive electrode by the method described in Embodiment 2. Note that the present invention is not limited to the following examples.
(Formation of Graphene Oxide)

Three kinds of graphene oxides (Graphene Oxides A to C) were formed by different steps and used for formation of electrodes. In addition, a graphene oxide formed without Step S12 was formed as Comparative Example 1 and used for formation of an electrode.

First, a dispersion liquid of graphene oxide (hereinafter, referred to as graphene oxide dispersion liquid) was formed by a method described below. At the beginning, 4 g of graphite and 138 mL of concentrated sulfuric acid were mixed to prepare a mixed solution. Then, 10 g of potassium permanganate was added to the mixed solution while they were stirred in an ice bath. The mixed solution was removed from the ice bath and stirring was performed at about 25° C. for 4.5 hours, so that Mixed Solution A containing graphite oxide was formed.

Then, 276 mL of water was added to Mixed Solution A containing graphite oxide while being stirred in an ice bath. After the resulting mixed solution was stirred in an oil bath at about 98° C. for 15 minutes so that reaction was caused, 400 mL of water and 30 mL of hydrogen peroxide solution (with a concentration of 30 wt %) were added to the mixed solution while they were stirred, in order to deactivate unreacted potassium permanganate. Consequently, Mixed Solution B was formed.

Next, suction filtration of Mixed Solution B was carried out using a membrane filter with a pore size of 0.45 μm to form a precipitate. After that, a mixed solution which was formed by adding a 3.5% hydrochloric acid to the precipitate and then stirring the mixture was subjected to suction filtration, so that a precipitate containing the graphite oxide was formed.

The precipitate containing the graphite oxide was mixed with 4 L of water and ultrasonic waves with a frequency of 40 kHz were applied to the obtained mixed solution for an hour, so that a graphene oxide dispersion was formed. Next, centrifugation was carried out at 9000 rpm to collect precipitated graphene oxide.

The obtained graphene oxide was dispersed into alcohol, and the pressure was reduced while the solution was stirred at 30° C. using an evaporator. The obtained sample was grounded with an automatic mortar and then located under reduced pressure, so that Graphene Oxides A to C were formed. Graphene Oxide A was formed by using ethanol as the alcohol. Graphene Oxide B was formed by using methanol as the alcohol. Graphene Oxide C was formed by using 1-propanol as the alcohol.

In formation of Comparative Example 1, the obtained graphene oxide was stirred under reduced pressure at 30° C. For 5 hours with an evaporator. The obtained sample was crushed with a dancing mill and located under reduced pressure, so that Comparative Example 1 was formed.

Figure 6:
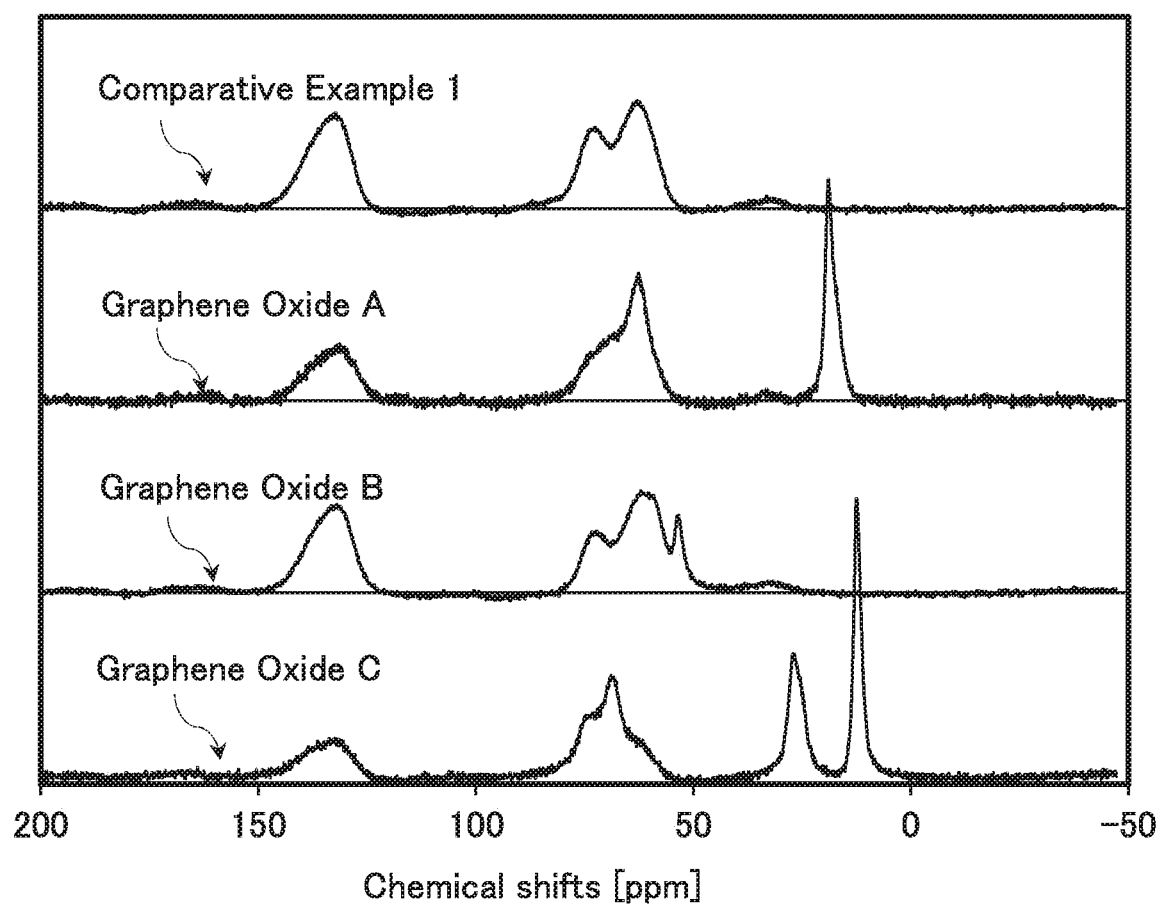
FIG. 6 shows solid-state $^{13}$C NMR spectra of graphene oxides.

FIG. 6 shows solid-state $^{13}$C NMR spectra of Comparative Example 1 and Graphene Oxides A to C. In spectra of Graphene Oxides A to C, the intensities of peaks at 73 ppm were largely decreased as compared with that of a peak in Comparative Example 1. In the spectra of Graphene Oxides B and C, peaks at 63 ppm were decreased. The peaks at 73 ppm and 63 ppm are attributed to carbon of an epoxy group and carbon bonded to a hydroxyl group. In the spectrum of Graphene Oxide A, peaks attributed to an ethoxy group were observed at 63 ppm and 19 ppm. In the spectrum of Graphene Oxide B, a peak attributed to a methoxy group was observed at 53 ppm. In the spectrum of Graphene Oxide C, peaks attributed to a 1-propoxy group were observed at 69 ppm, 27 ppm, and 12.5 ppm.

The above observation results show that in each of Graphene Oxides A to C, the amount of epoxy groups was smaller than that in Comparative Example 1, and an alkoxy group attributed to the added alcohol was introduced.

Next, battery cells in which positive electrodes including conductive additives using Graphene Oxides A to C and Comparative Example 1 as raw materials are incorporated were formed, and charge and discharge characteristics of the battery cells were compared.

(Formation of Positive Electrode)

Using Graphene Oxides A to C and Comparative Example 1, positive electrodes were formed. First, positive electrode active material (LiFePO$_4$) particles, a binder (PVdF manufactured by KUREHA Corporation), any one of Graphene Oxides A to C and Comparative Example 1 as a raw material of the conductive additive were mixed, whereby a mixture (also referred to as positive electrode paste) was formed The compounding ratio (LiFePO$_4$:graphene oxide; PVdF) in the positive electrode paste was set to 93:2.5 (unit: wt %). The positive electrode past was applied to a current collector (aluminum) and heated and reduced under reduced pressure, whereby a positive electrode was formed. The supported amount of the positive electrode paste with respect to the current collector was 6 mg/cm$^2$. For a reduction method of the graphene oxide, thermal reduction or chemical reduction was used.

Thermal reduction treatment of the graphene oxide was performed in such a manner that an active material layer was heated at 170° C. for 10 hours under reduced pressure. Chemical reduction treatment of the graphene oxide was performed in such a manner that an active material layer was immersed in a polar solvent containing a reducing agent and heated at 60° C. for an hour. As the solvent, an aqueous solution containing NMP at 90 vol % was used, and as a reducing agent, a solution in which ascorbic acid was dissolved at 77 mmol/L was used.

(Discharge Characteristics)

The obtained positive electrodes were incorporated in half cells, and charge and discharge characteristics of the cells were measured. A lithium metal was used as a negative electrode. The electrolyte solution was formed in such a way that lithium hexafluorophosphate (LiPF$_6$) was dissolved at a concentration of 1 mol/L in a solution in which ethylene carbonate (EC) and diethyl carbonate (DEC) were mixed at a volume ratio of 1:1.

The cells are called Cells A, B, C, D, E, and F, Comparative Example 2, and Comparative Example 3, for convenience. Cells A, B, and C indicate the cells including electrodes that were subjected to thermal reduction treatment and used Graphene Oxides A, B, and C as raw materials of conductive additives. Cells D, F, and F indicate cells including electrodes that were subjected to chemical reduction treatment and used Graphene Oxides A, B, and C as raw materials of conductive additives. In addition, Comparative Example 2 indicates a cell including an electrode that was subjected to thermal reduction treatment and used Comparative Example 1 as a raw material of the conductive additive. Comparative Example 3 indicates a cell including an electrode that was subjected to chemical reduction treatment and used Comparative Example 1 as a raw material of the conductive additive.

Next, measurement results of charge and discharge characteristics of the formed cells are described.

First, constant current (CC) charging, constant current constant voltage (CCCV) charging, and CC discharging are described.

<CC Charging>

Figure 7A:
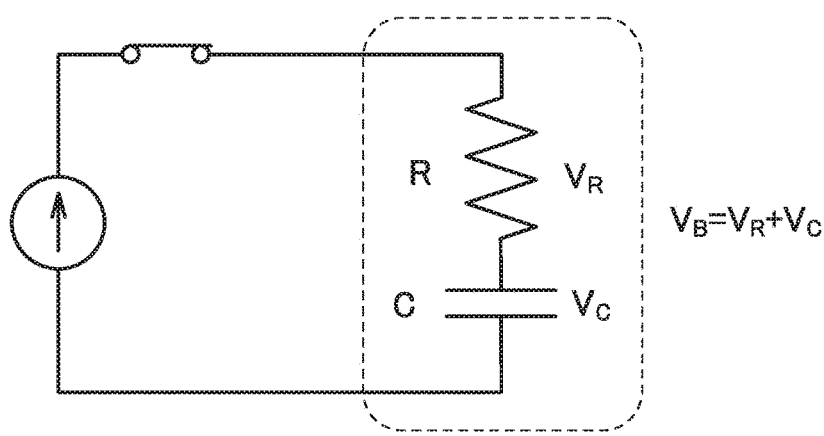
FIGS. 7A to 7C show a charge/discharge test.

CC charging is described. CC charging is a charging method in which a constant current is made to flow to a secondary battery in the whole charging period and charging is terminated when the voltage reaches a predetermined voltage. The secondary battery is assumed to be expressed by an equivalent circuit with internal resistance R and secondary battery capacity C as illustrated in FIG. 7A. In this case, a secondary battery voltage $V_B$ is the sum of a voltage $V_R$ applied to the internal resistance R and a voltage $V_C$ applied to the secondary battery capacity C.

While the CC charging is performed, a switch is on as illustrated in FIG. 7A, so that a constant current I flows to the secondary battery. During the period, the current I is constant; thus, according to the Ohm's law ($V_R$=R×I), the voltage $V_R$ applied to the internal resistance R is also constant. In contrast, the voltage $V_C$ applied to the secondary battery capacity C increases over time. Accordingly, the secondary battery voltage $V_B$ increases over time.

Figure 7B:
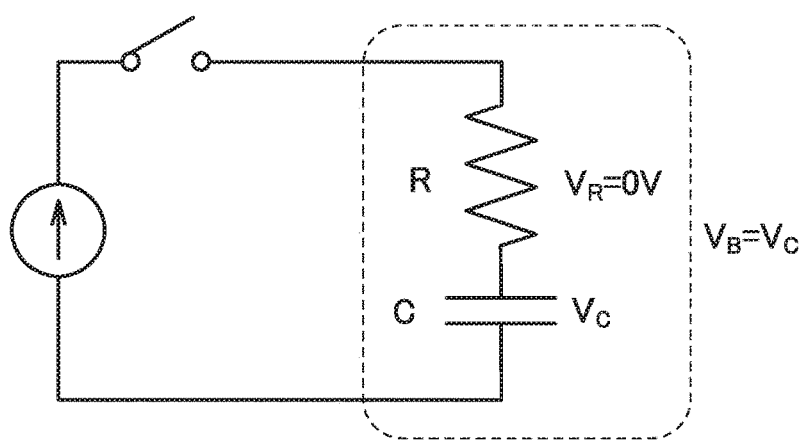

When the secondary battery voltage $V_B$ reaches a predetermined voltage, e.g., 4.1 V, the charging is terminated. On termination of the CC charging, the switch is turned off as illustrated in FIG. 7B, and the current I becomes 0. Thus, the voltage $V_R$ applied to the internal resistance R becomes 0 V. Consequently, the secondary battery voltage $V_B$ is decreased by the lost voltage drop in the internal resistance R.

Figure 7C:
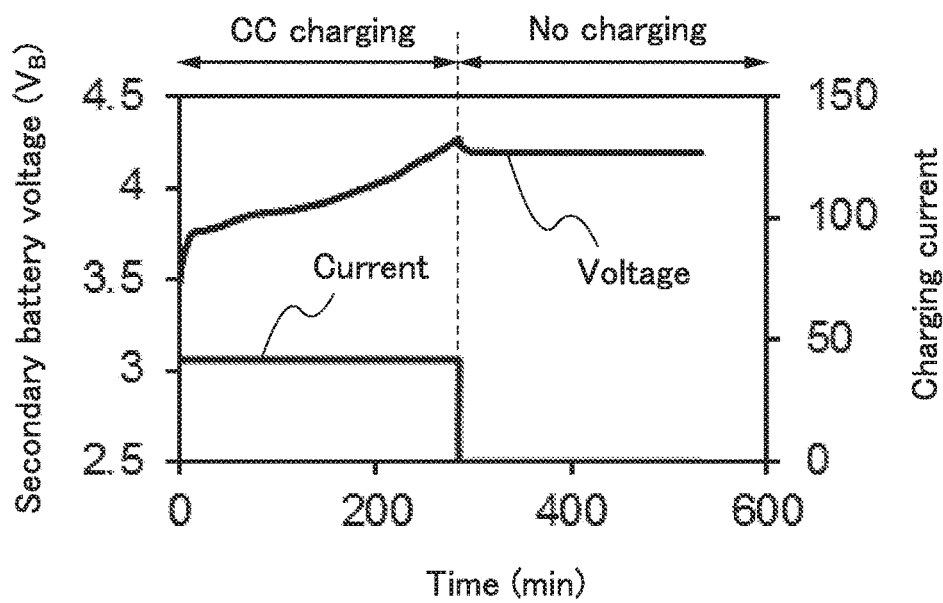

FIG. 7C shows an example of the secondary battery voltage $V_B$ and charging current while the CC charging is performed and after the CC charging is terminated. The secondary battery voltage $V_B$ increases while the CC charging is performed, and slightly decreases after the CC charging is let initiated.

<CCCV Charging>

Next, CCCV charging will be described. CCCV charging is a charging method in which CC charging is performed until the voltage reaches a predetermined voltage and then CV (constant voltage) charging is performed until the amount of current flow becomes small, specifically, a termination current value.

Figure 8A:
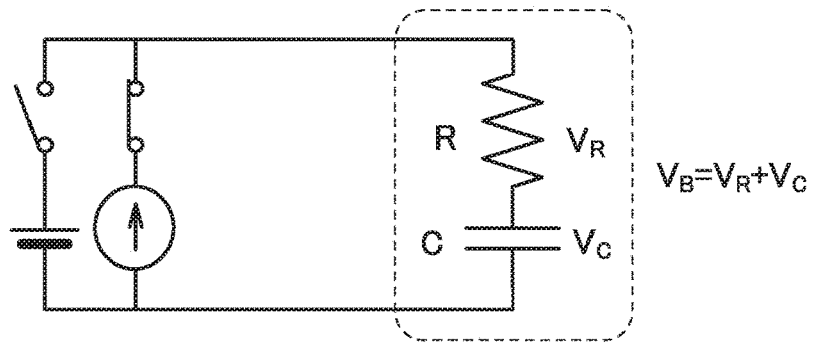
FIGS. 8A to 8D show a charge/discharge test.

While the CC charging is performed, a switch of a constant current power source is on and a switch of a constant voltage power source is off as illustrated in FIG. 8A, so that the constant current I flows to a secondary battery. During the period, the current I is constant; thus, according to the Ohm's law ($V_R$=R×I), the voltage $V_R$ applied to the internal resistance R is also constant. In contrast, the voltage $V_C$ applied to the secondary battery capacity C increases over time. Accordingly, the secondary battery voltage $V_B$ increases over time.

Figure 8B:
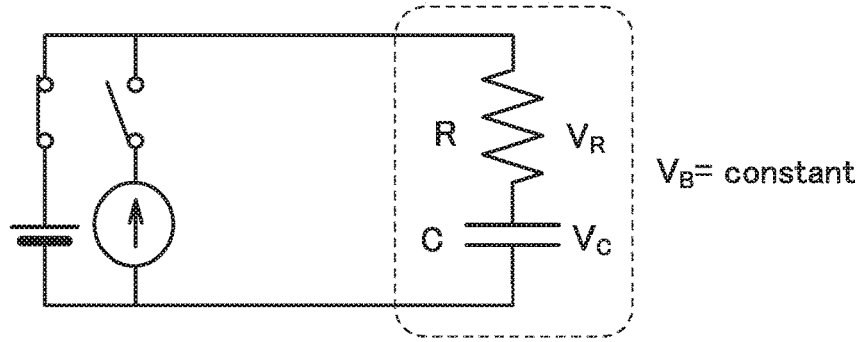

When the secondary battery voltage $V_B$ reaches a predetermined voltage, e.g., 4.1 V, switching is performed from the CC charging to the CV charging. While the CV charging is performed, the switch of the constant voltage power source is on and the switch of the constant current power source is off as illustrated in FIG. 8B; thus, the secondary battery voltage $V_B$ is constant. In contrast, the voltage $V_C$ applied to the secondary battery capacity C increases over time. Since $V_B=V_R+V_C$ is satisfied, the voltage $V_R$ applied to the internal resistance R decreases over time. As the voltage $V_R$ applied to the internal resistance R decreases, the current I flowing to the secondary battery also decreases according to the Ohm's law ($V_R$=R×I).

Figure 8C:
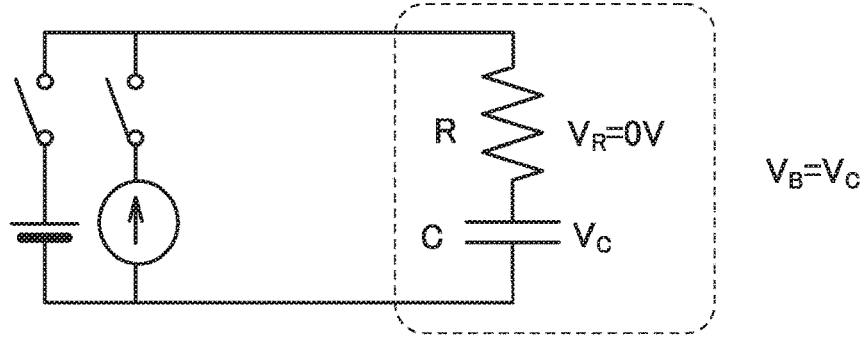

When the current I flowing to the secondary battery becomes a predetermined current, e.g., approximately 0.01 C, charging is terminated. On termination of the CCCV charging, all the switches are turned off as illustrated in FIG. 8C, so that the current I becomes 0. Thus, the voltage $V_R$ applied to the internal resistance R becomes 0 V. However, the voltage $V_R$ applied to the internal resistance R becomes sufficiently small by the CV charging; thus, even when a voltage drop no longer occurs in the internal resistance R, the secondary battery voltage $V_B$ hardly decreases.

Figure 8D:
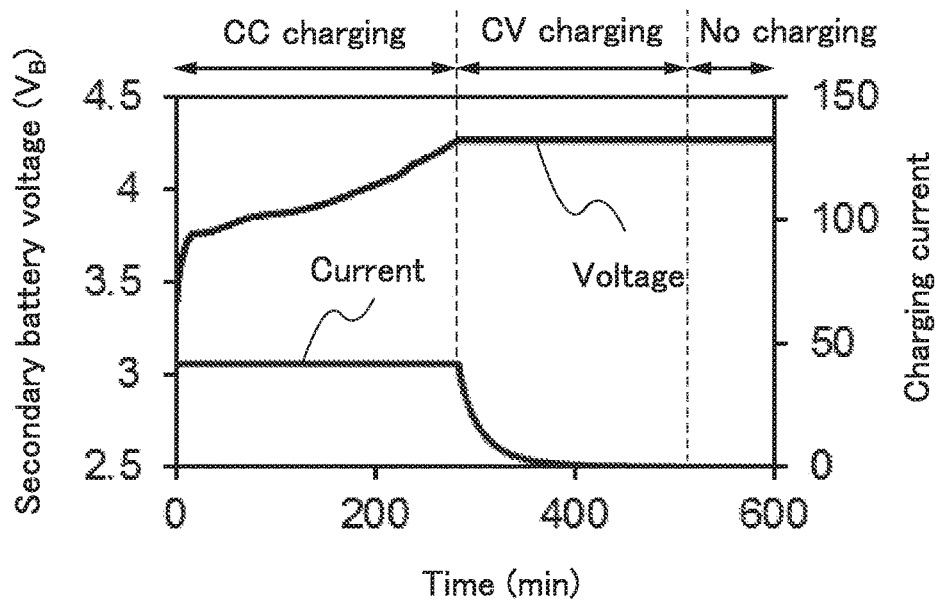

FIG. 8D shows an example of the secondary battery voltage $V_B$ and charging current while the CCCV charging is performed and after the CCCV charging is terminated. Even after the CCCV charging is terminated, the secondary battery voltage $V_B$ hardly decreases.

<CC Discharging>

Next, CC discharging will be described. CC discharging is a discharging method in which a constant current is made to flow from a secondary battery in the whole discharging period and discharging is ended when the secondary battery voltage $V_B$ reaches a predetermined voltage, e.g., 2.5 V.

Figure 9:
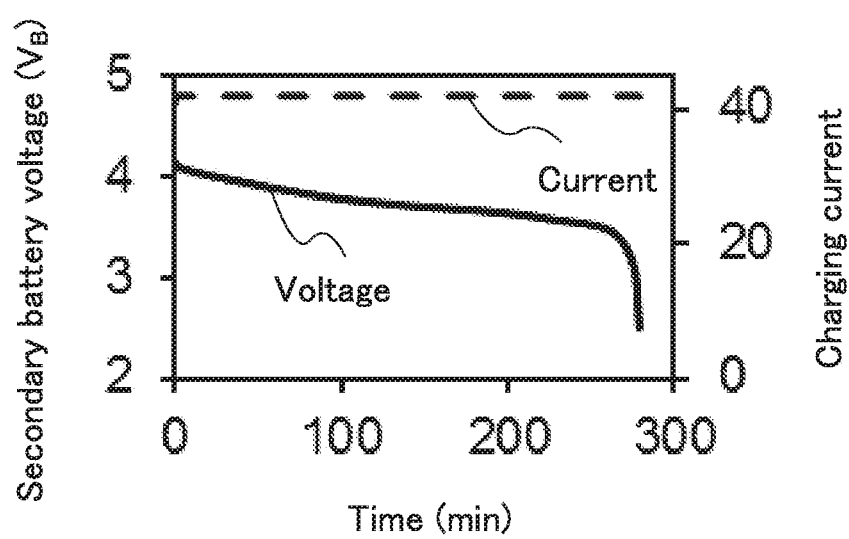
FIG. 9 shows a charge/discharge test.

FIG. 9 shows an example of the secondary battery voltage $V_B$ and charging current while the CC discharging is performed. As discharging proceeds, the secondary battery voltage $V_B$ decreases.

Next, a charge rate and a discharge rate will be described. The discharge rate refers to the relative ratio of discharging current to battery capacity and is expressed in a unit C. A current of approximately 1 C in a battery with a rated capacity X (Ah) is X A. The case where discharging is performed at a current of 2X A is rephrased as follows: discharging is performed at 2 C. The case where discharging is performed at a current of X/5 A is rephrased as follows: discharging is performed at 0.2 C. Similarly, the case where charging is performed at a current of 2X A is rephrased as follows: charging is performed at 2 C, and the case where charging is performed at a current of X/5 A is rephrased as follows: charging is performed at 0.2 C.

Figure 10A:
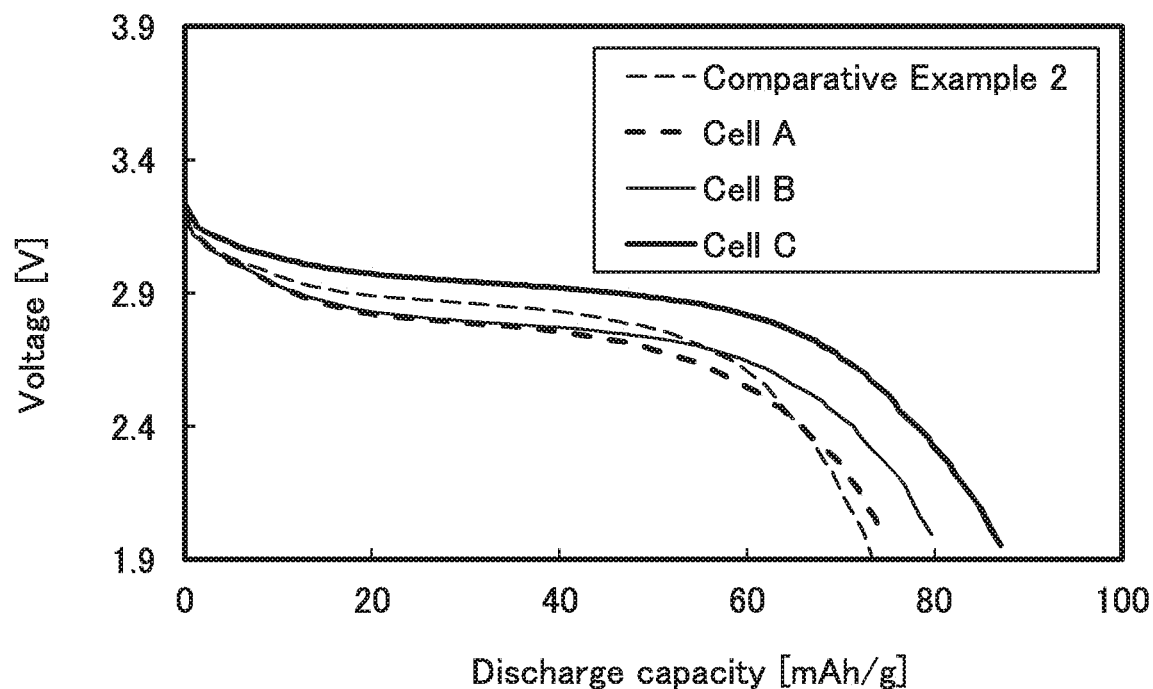
FIGS. 10A and 10B each show comparison of discharge characteristics.
Figure 10B:
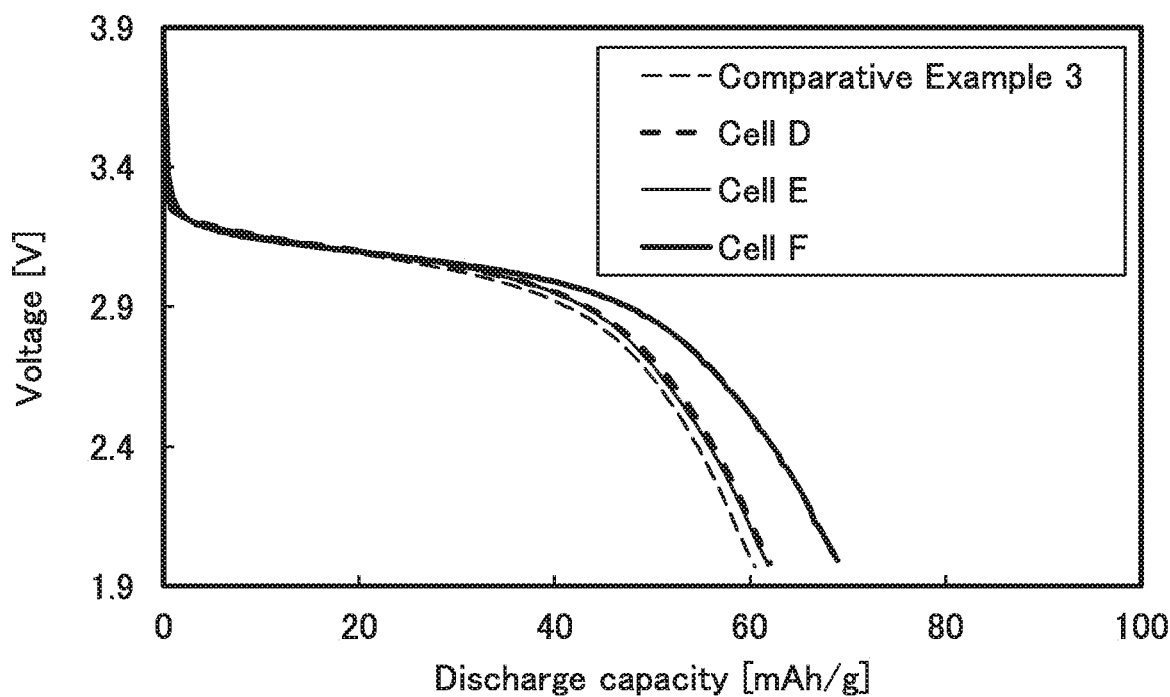

In this example, the charging condition was CCCV charging, and the charging rate was set to 0.2 C for measurement. The discharge condition was CC discharging, and the discharging rate was changed per cycle, 0.2 C, 0.2 C, 1 C, 2 C, 5 C, and 10 C, for measurement. FIGS. 10A and 10B show discharge curves when the discharging rate is 10 C.

FIGS. 10A and 10B are each a graph showing the discharge characteristics, where the horizontal axis represents discharge capacity (mAh/g) and the vertical axis represents voltage (V).

Cells A, B, and C each have higher discharge capacity than Comparative Example 2. In particular, Cell C has the most favorable discharge characteristics. Moreover, Cell C has higher plateau potential than Comparative Example 2.

Cells D, E, and F each have higher discharge capacity than Comparative Example 3. In particular, Cell F has the most favorable discharge characteristics.

As described above, the cell that includes an electrode using graphene oxide with an alkoxy group as a raw material of a conductive additive has more favorable discharge characteristics than the cell that includes an electrode using graphene oxide without an alkoxy group as a raw material of a conductive additive. In particular, when an electrode that includes Graphene Oxide C using 1-propanol was used, Cells C and F having the most favorable discharge characteristics can be obtained. Thus, it is found that a network for electron conductivity is sufficiently formed in a positive electrode active material layer in which graphene oxide with an alkoxy group is dispersed in the positive electrode paste.

Furthermore, in the cell that includes an electrode formed by thermal reduction performed on graphene oxide with 1-propoxy group, a plateau potential is increased as compared with that in the cell that includes an electrode formed by thermal reduction performed on graphene oxide without an alkoxy group. Thus, the electrode formed by thermal reduction performed on graphene oxide with 1-propoxy group has high conductivity. In contrast, on the condition that chemical reduction was performed, a change in plateau potential depending on the presence or absence of an alkoxy group on the graphene oxide was not observed. Thus, it is revealed that the graphene oxide with 1-propoxy group can be reduced efficiently to be graphene by thermal reduction.

Next, the graphene oxide was reduced to be reduced graphene oxide (RGO), and the electrical conductivity of RGO was evaluated by powder electrical conductivity measurement.

(Formation of RGO)

Graphene Oxides A to C were held under reduced pressure for an hour and then subjected to heat treatment. In the heat treatment, the temperature was increased to 170° C. and then held for 10 hours. The obtained RGOs were put into a pellet dice with a radius of 5 mm and pressurization was performed by a hydraulic pump for 10 minutes and stopped, and after that, pressurization was performed again for 10 minutes, so that pellets were formed. The pressure applied to powder per unit area was approximately 7.5 Mgf/cm$^2$. The obtained pellets are referred to as Samples A to C. Samples A, B, and C correspond to RGOs formed using Graphene Oxides A, B, and C. In addition, Comparative Example 1 was also subjected to reduction treatment to form a pellet, so that Comparative Example 4 was formed.

The resistivities of Sample A, Sample B, Sample C, and Comparative Example 4 were measured by a four-point van der Pauw method. For the measurement of the resistivities, ResiTest8300 (manufactured by TOYO Corporation) was used. A result thereof is shown in Table 1.

TABLE 1

| Sample | Electrtic Conductivity [S/cm] | Resistivity [Ω · cm] |
|---|---|---|
| Comparative Example 4 | 7.05 | $1.42 \times 10^{-1}$ |
| Sample A | $1.52 \times 10$ | $6.57 \times 10^{2}$ |
| Sample B | 8.65 | $1.16 \times 10^{-1}$ |
| Sample C | $1.41 \times 10$ | $7.09 \times 10^{-2}$ |

Table 1 shows electric conductivity and resistivities of Comparative Example 4 and Samples A to C.

As shown in Table 1, Samples A to C each have higher electric conductivity than Comparative Example 4. According to this result. Samples A to C are more reduced than Comparative Example 4 and have graphene structures. This suggests that the graphene oxide formed using alcohol is more likely to be reduced by thermal reduction than graphene oxide formed using water.

(Comparison of Reduction Rate)

Next, in order to compare the reduction rates of graphene oxides under mild conditions, Graphene Oxide A, Graphene Oxide C, and Comparison Example 1 were stored for year and a half. The samples were stored in a dry room at 25° C.

Solid-state $^{13}C$ NMR of Graphene Oxides A and C and Comparative Example 1 after storage was measured and compared with those before storage. In Comparative Example 1, a large change in spectrum between before and after the storage was not observed. In contrast, in Graphene Oxide A after the storage, peaks at 63 ppm and 19 ppm attributed to an ethoxy group disappeared, and the intensity of a broad peak at approximately 130 ppm attributed to carbon of graphene was increased. In Graphene Oxide C, the intensities of peaks at 69 ppm, 27 ppm, and 12.5 ppm attributed to a propoxy group were decreased, and the intensity of a broad peak at approximately 130 ppm was increased. The above results suggest that Graphene Oxides A and C were reduced through the storage. Thus, it is confirmed that the graphene oxide including an alkoxy group is easily reduced at room temperature.

EXPLANATION OF REFERENCE

100: storage battery electrode, 101: current collector, 102: active material layer, 103: active material, 104: graphene, 106: graphene oxide, 107: graphene oxide, 108: graphene oxide, 300: coin-type storage battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 500: storage battery, 501: positive electrode current collector, 502: positive electrode active material layer, 503: positive electrode, 504: negative electrode current collector, 505: negative electrode active material layer, 506: negative electrode, 507: separator, 508: electrolytic solution, 509: exterior body, 600: storage battery, 601: positive electrode cap, 602: battery can, 603: positive electrode terminal, 604: positive electrode, 605: separator, 606: negative electrode, 607: negative electrode terminal, 608: insulating plate, 609: insulating plate, 610: gasket (insulating gasket), 611: PTC element, 612: safety valve mechanism, 700: display device, 701: housing, 702: display portion, 703: speaker portion, 704: storage battery, 710: lighting device, 711: housing, 712: light source, 713: storage battery, 714: ceiling, 715: wall, 716: floor, 717: window, 720: indoor unit, 721: housing, 722: air outlet, 723: storage battery, 724: outdoor unit, 730: electric refrigerator-freezer, 731: housing, 732: door for refrigerator, 733: door for freezer, 734: storage battery, 800: tablet terminal, 801: housing, 802: display portion, 802a: display portion, 802b: display portion, 803: switch for switching display modes, 801: power switch, 805: switch for switching to power-saving mode, 807: operation switch, 808a: touch panel area, 808b: touch panel area, 809: operation key, 810: keyboard display switching button, 811: solar cell, 850: charge/discharge control circuit, 851: battery, 852: DC-DC converter, 853: converter, 860: electric vehicle, 861: battery, 862: control circuit, 863: driving device, 864: processing unit This application is based on Japanese Patent Application serial no. 2014-172503 filed with Japan Patent Office on Aug. 27, 2014, the entire contents of which are hereby incorporated by reference.

What is claimed is:

1. A method for manufacturing a storage battery electrode, comprising the steps of:
    dispersing graphene oxide into a solution, the solution containing alcohol or acid;
    heating the graphene oxide in the solution;
    forming a first mixture comprising the graphene oxide, a first solvent, and an active material after heating the graphene oxide;
    removing at least a part of the first solvent in the first mixture;
    forming a second mixture comprising graphene by reducing the graphene oxide in the first mixture after removing at least a part of the first solvent;
    forming a third mixture comprising the second mixture, a binder, a conductive additive, and a second solvent; and
    removing at least a part of the second solvent in the third mixture.

2. The method for manufacturing a storage battery electrode according to claim 1, further comprising a step of applying the third mixture on a current collector before the step of removing the second solvent.

3. The method for manufacturing a storage battery electrode according to claim 1,
    wherein the step of reducing the graphene oxide is performed by immersing the graphene oxide in a polar solvent comprising a reducing agent.

4. The method for manufacturing a storage battery electrode according to claim 1,
    wherein the step of reducing the graphene oxide is performed by heating the graphene oxide, and
    wherein a heating temperature at the step of heating the graphene oxide is higher than or equal to 60° C. and lower than or equal to 150° C.

5. The method for manufacturing a storage battery electrode according to claim 1, wherein the alcohol is 1-propanol, 2-propanol, 1-butanol, 2-butanol, isobutyl alcohol, or tert-butyl alcohol.

6. The method for manufacturing a storage battery electrode according to claim 1, wherein the acid is carboxylic acid.

7. The method for manufacturing a storage battery electrode according to claim 1, wherein the active material comprises lithium.

8. A method for manufacturing a storage battery electrode, comprising the steps of:
- dispersing graphene oxide into a solution, the solution containing alcohol or acid;
- heating the graphene oxide in the solution;
- forming a first mixture comprising the graphene oxide, a first solvent, and an active material after heating the graphene oxide;
- removing the first solvent in the first mixture;
- forming a second mixture comprising graphene by reducing the graphene oxide in the first mixture after removing the first solvent;
- forming a third mixture comprising the second mixture, a binder, a conductive additive, and a second solvent; and
- removing the second solvent in the third mixture.

9. The method for manufacturing a storage battery electrode according to claim 8, further comprising a step of applying the third mixture on a current collector before the step of removing the second solvent.

10. The method for manufacturing a storage battery electrode according to claim 8,
wherein the step of reducing the graphene oxide is performed by immersing the graphene oxide in a polar solvent comprising a reducing agent.

11. The method for manufacturing a storage battery electrode according to claim 8,
wherein the step of reducing the graphene oxide is performed by heating the graphene oxide, and
wherein a heating temperature at the step of heating the graphene oxide is higher than or equal to 60° C. and lower than or equal to 150° C.

12. The method for manufacturing a storage battery electrode according to claim 8, wherein the alcohol is 1-propanol, 2-propanol, 1-butanol, 2-butanol, isobutyl alcohol, or tert-butyl alcohol.

13. The method for manufacturing a storage battery electrode according to claim 8, wherein the acid is carboxylic acid.

14. The method for manufacturing a storage battery electrode according to claim 8, wherein the active material comprises lithium.

* * * * *